US008606023B2

(12) United States Patent
Reznik et al.

(10) Patent No.: US 8,606,023 B2
(45) Date of Patent: *Dec. 10, 2013

(54) REDUCTION OF ERRORS DURING COMPUTATION OF INVERSE DISCRETE COSINE TRANSFORM

(75) Inventors: Yuriy Reznik, San Diego, CA (US); Harinath Garudadri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1125 days.

This patent is subject to a terminal disclaimer.

(21) Appl. No.: 11/767,452

(22) Filed: Jun. 22, 2007

(65) Prior Publication Data

US 2007/0297504 A1 Dec. 27, 2007

Related U.S. Application Data

(60) Provisional application No. 60/841,362, filed on Aug. 30, 2006, provisional application No. 60/847,194, filed on Sep. 25, 2006, provisional application No. 60/816,697, filed on Jun. 26, 2006, provisional application No. 60/869,530, filed on Dec. 11, 2006, provisional application No. 60/829,669, filed on Oct. 16, 2006.

(51) Int. Cl.
*G06K 9/36* (2006.01)
*H04B 1/66* (2006.01)
*G06F 15/00* (2006.01)

(52) U.S. Cl.
USPC ............................ 382/232; 375/240; 708/203

(58) Field of Classification Search
USPC ............................ 382/232; 375/240; 708/203
See application file for complete search history.

(56) References Cited

U.S. PATENT DOCUMENTS 5,129,015 A 7/1992 Allen et al.
5,285,402 A 2/1994 Keith
(Continued)

FOREIGN PATENT DOCUMENTS

CN 1653822 A 8/2005
EP 0955608 11/1999
(Continued)

OTHER PUBLICATIONS

Y.Arai, T. Agui, and M. Nakajima, "A Fast DCT-SQ Scheme for Images", Transactions of the IEICE E 71(11):1095, Nov. 1988.
(Continued)

*Primary Examiner* — Nirav G Patel
(74) *Attorney, Agent, or Firm* — Brent Boyd

(57) ABSTRACT

Techniques are described to reduce rounding errors during computation of discrete cosine transform using fixed-point calculations. According to these techniques, a discrete cosine transform a matrix of scaled coefficients is calculated by multiplying coefficients in a matrix of coefficients by scale factors. Next, a midpoint bias value and a supplemental bias value are added to a DC coefficient of the matrix of scaled coefficients. Next, an inverse discrete cosine transform is applied to the resulting matrix of scaled coefficients. Values in the resulting matrix are then right-shifted in order to derive a matrix of pixel component values. As described herein, the addition of the supplemental bias value to the DC coefficient reduces rounding errors attributable to this right-shifting. As a result, a final version of a digital media file decompressed using these techniques may more closely resemble an original version of a digital media file.

84 Claims, 12 Drawing Sheets

(56) References Cited

U.S. PATENT DOCUMENTS

| | | | |
|---|---|---|---|
| 5,642,438 | A | 6/1997 | Babkin |
| 5,754,456 | A | 5/1998 | Eitan et al. |
| 5,974,185 | A | 10/1999 | Boyce et al. |
| 6,009,207 | A | 12/1999 | Chen |
| 6,020,838 | A | 2/2000 | Knudsen et al. |
| 6,026,183 | A | 2/2000 | Talluri et al. |
| 6,167,092 | A | 12/2000 | Lengwehasatit |
| 6,292,817 | B1 | 9/2001 | Matsui |
| 6,529,634 | B1 | 3/2003 | Thyagarajan et al. |
| 6,539,058 | B1 * | 3/2003 | Pearlstein et al. ....... 375/240.25 |
| 6,694,342 | B1 | 2/2004 | Mou |
| 6,704,358 | B1 | 3/2004 | Li et al. |
| 6,735,609 | B2 | 5/2004 | Dixit et al. |
| 6,799,192 | B1 | 9/2004 | Handley |
| 6,909,753 | B2 | 6/2005 | Meehan et al. |
| 7,054,493 | B2 | 5/2006 | Schwartz |
| 2001/0026642 | A1 | 10/2001 | Kang et al. |
| 2002/0090028 | A1 | 7/2002 | Comer et al. |
| 2002/0090029 | A1 | 7/2002 | Kim |
| 2002/0154693 | A1 | 10/2002 | Demos et al. |
| 2003/0078953 | A1 | 4/2003 | Hallapuro et al. |
| 2003/0177158 | A1 | 9/2003 | Zheltov et al. |
| 2004/0010528 | A1 | 1/2004 | Kumar et al. |
| 2004/0091157 | A1 | 5/2004 | Kang |
| 2004/0117418 | A1 | 6/2004 | Vainsencher et al. |
| 2005/0004962 | A1 | 1/2005 | Ju |
| 2005/0033788 | A1 | 2/2005 | Handley |
| 2005/0050128 | A1 | 3/2005 | Ju |
| 2005/0196055 | A1 | 9/2005 | Zhong et al. |
| 2006/0129622 | A1 | 6/2006 | Dang |
| 2007/0003153 | A1 | 1/2007 | Miller-Smith |
| 2007/0297502 | A1 | 12/2007 | Reznik |
| 2007/0297503 | A1 | 12/2007 | Reznik |
| 2007/0299897 | A1 * | 12/2007 | Reznik ......................... 708/409 |
| 2008/0095245 | A1 | 4/2008 | Reznik |

FOREIGN PATENT DOCUMENTS

| | | | |
|---|---|---|---|
| EP | 0990992 | | 4/2000 |
| GB | 2304946 | A | 3/1997 |
| JP | 2002537736 | A | 11/2002 |
| JP | 2002374531 | A | 12/2002 |
| JP | 2005157832 | | 6/2005 |
| KR | 1019990087552 | | 12/1999 |
| KR | 1020000013653 | | 3/2000 |
| KR | 1020030045028 | | 6/2003 |
| KR | 1020060135613 | | 12/2006 |
| RU | 2119727 | | 9/1998 |
| RU | 2122295 | | 11/1998 |
| RU | 2128405 | | 3/1999 |
| RU | 2196391 | | 1/2003 |
| RU | 2273112 | | 3/2006 |
| TW | 395135 | | 6/2000 |
| TW | 224931 | | 12/2004 |
| WO | WO9210925 | | 6/1992 |
| WO | WO9421083 | A1 | 9/1994 |
| WO | WO9733236 | | 9/1997 |
| WO | WO9834406 | A1 | 8/1998 |
| WO | WO9939303 | | 8/1999 |
| WO | WO0049810 | A1 | 8/2000 |
| WO | 0135673 | A1 | 5/2001 |
| WO | WO0251160 | | 6/2002 |

OTHER PUBLICATIONS

Hinds, et al.: "On IDCT Exactness, Precision, and Draft Problem," International Organization for Standardization ISO/IEC JTC1 SC29/WG11 Coding of Moving Pictures and Audio, No. M13657, pp. 1-15, Jul. 17, 2006, XP030042326.

Reznik: "On clipping and dynamic range of variables in IDCT designs", ISO/IEC JTC/SC29 WG11 input document MPEG2006/M14004, Oct. 2006, Hangzhou China, pp. 1-8, XP030042672.

Zhou, et al..: "IDCT output range before clipping in MPEG video coding," Signal Processing: Image Communication, vol. 11, No. 2, pp. 137-145, Dec. 1997, XP004100330.

IEEE Std. 1180-1990; "IEEE Standard Specifications for the Implementations of 8×8 Inverse Discrete Cosine Transform," IEEE CAS Standards Committee of the IEEE Circuits and Systems Society, pp. 1-13, Approved Dec. 6, 1990.

M12936: C-X Zhang and L.Yu, "Low complexity and High Fidelity Fixed-Point Multiplier-less DCT/IDCT Implementation Scheme," ISO/IEC JTC1/SC29/WG11 MPEG 2006/M12936, Jan. 2006, Bangkok, Thailand, pp. 1-10.

M13001: Yuriy A. Reznik and Arianne T. Hinds, "Improved Proposal for MPEG Fixed-Point 8×8 IDCT Standard," ISO/IEC JTC1/SC29/WG11 MPEG2006/M13001, Jan. 2006, Bangkok, Thailand, pp. 1-22.

M13256: C-X Zhang and L. Yu, "Improved Fixed-Point DCT/IDCT Implementation Scheme with Low Complexity and High Fidelity," ISO/IEC JTC1/SC29/WG11 MPEG2006/M13256, Apr. 2006, Montreux, Switzerland, pp. 1-6.

M13326: Yuriy A. Reznik and Arianne T. Hinds, "Proposed Core Experiement on Exploration on Convergence of Scaled and Non-Scaled IDCT Designs," ISO/IEC JTC1/SC29/WG11 MPEG2006/M13326, Apr. 2006, Montreux, Switzerland, pp. 1-9.

M13375: Michael A. Isnardi, "Description of Sample Bitstream for Testing IDCT Linearity," ISO/IEC JTC1/SC29/WG11 MPEG2006/M13375, Apr. 2006, Montreux, Switzerland, pp. 1-8.

ISO/IEC JTC1/SC29/WG11N7292 [11172-6 Study of FCD] Information Technology—Coding of Moving Pictures and Associated Audio for Digital Storage Media at up to About 1.5 Mbit/s—Part 6: Specification of Accuracy Requirements for Implementation of Integer Inverse Discrete Cosine Transform, IEEE standard 1180-1190, pp. 1-14, Approved Dec. 6, 1990.

ISO/IEC JTC1/SC29/WG11 N7335, "Call for Proposals on Fixed-Point 8×8 IDCT and DCT Standard," pp. 1-18, Poznan, Poland, Jul. 2005.

ISO/IEC JTC 1/SC 29/WG11 N7815 [23002-1 FDIS] "Information technology—MPEG video technologies—Part 1: Accuracy requirements for implementation of interger-output 8×8 inverse discrete cosine transform," pp. 1-18.

ISO/IEC JTC1/SC29/WG11 N7817 [23002-2 WD1] "Information technology—MPEG Video Technologies—Part 2: Fixed-point 8×8 IDCT and DCT transforms," pp. 1-27.

ISO/IEC 11172:1992 "Information Technology—Coding of moving pictures and associated audio for digital storage media at up to about 1,5 Mbit/s—Part 2—Video," pp. 1-222.

ISO/IEC 14496-2:2001 "Information technology—Coding of audio/visual objects—Part 2: Visual," Jul. 2001, PART1, pp. 1-249.

MPEG-2 TM5 Encoder / Decoder, Version 1.2, Jul. 19, 1996, MPEG Software Simulation Group, Retrieved from http://www.mpeglorg/MPEG/MSSG/Codec/readme.txt.

Bivolarksi L: "Low complexity 1D IDCT for 16-bit parallel architectures" Applications of Digital Signal Processing XXX, Proceedings of SPIE, vol. 6696, Sep. 24, 2007, pp. 669619-1-669619-8, XP002605975.

Bivolarski L et al: "m13993.zip" Screenshot of Content of Compressed File M13993. ZIP, Oct. 23, 2006, XP002605952.

Bivolarski L et al: "On implementation of IDCTs on existing 16-bit architectures" ISO/IEC JTC1/SC29/WG11 M13993, Oct. 2006, Hangzhou, China, Oct. 23, 2006, XP030042661.

Bivolarski L: "16-bit fixed-point 8x8 IDCT implementation" ISO/IEC JTC1/SC29/WG11 M13500, Jul. 2006, Klagenfurt, Austria, Jul. 12, 2006, XP030042169.

Bivolarski L: "IDCT16.C..txt" C Code Submitted With Contribution Document M13500, Jul. 12, 2006, XP002605950.

Bivolarski L: "m13500.zip" Screenshot of Content of Compressed File M13500.ZIP, Jul. 12, 2006, XP002605951.

Ci-Xun Zhang et al: "Extended Results for Fixed-Point 8x8 DCT/IDCT Design and Implementation" ISO/IEC JTC1/SC29/WG11 M12935, Jan. 2006, Bangkok, Thailand, No. M12935, Jan. 19, 2006, XP030041604.

Ci-Xun Zhang et al: "Systematic approach of fixed point 8x8 IDCT and DCT design and implementation" Picture Coding Symposium 2006, Apr. 24-26, 2006, Beijing, China, Apr. 24, 2006, XP030080252.

(56) References Cited

OTHER PUBLICATIONS

Ci-Xun Zhang et al:"m12935-idct-high-accuracy. C" Code Submitted With Contribution Document M12935, Jan. 19, 2006, XP002605954.
Ci-Xun Zhang: "m12935.zip" Screenshot of Content of Compressed File M12935.ZIP, Jan. 19, 2006, XP002605955.
Gregor Rozinaj et al.; "Approximation of DCT without multiplication in JPEG"; Oct. 1996, IEEE ICECS '96 Proceeding, 704-707.
Hassan El-Banna et al.; An efficient implementation of the 1D DCT using FPGA technology.; Dec. 2003, Microelectronics Proceedings of the 15th International Conference, 278-281.
Hinds, A: "m14531.zip," Screenshots of Content of Compressed File M14531.ZIP, (Apr. 21, 2007), XP002610524.
Hinds, Arianne T.: "Fixed-Point IDCT Conformance Tests," ISO/IEC JTC1/SC29/WG11, MPEG2007/M14531, IBM, San Jose, USA, (Apr. 21, 2007), XP030043168.
International Search Report and Written Opinion—PCT/US2007/072039, International Search Authority—European Patent Office—Nov. 19, 2010.
James D. Allen et al.; The multiply-free chen transform—a rational approach to JPEG; 1991, Picture Coding Symposium PCS 91; 8.6-1 to 8.6-4.
Jan Richardson, Video Encoding H.264 and Mpeg-4—Standards of New Generation, Moscow, Technosfera, 2005, pp. 70-85.
Lee, Ying-Pin et al. "A Cost Effective Architecture for 8X8 two-Dimensional DCT/IDCT Using Direct Method", IEEE Transactions on Circuits and Systems for Video Technology, vol. 7, No. 3, pp. 459-467, Jun. 1997.
Li, W.; "A New Algorithm to Compute the DCT and its Inverse"; Jun. 1991, IEEE Transactions on Signal Processing, 1305-1313.
Rao, et al.: "Discrete cosine transform: algorithms, advantages, applications," Academic Press Professional, Inc., San Diego, CA, pp. 490, ISBN: 0-12-580203-X, 1990, Ch. 3-4.
Reznik Y et al: "Additional information on IDCT CD candidates and proposed core experiments" ISO/IEC JTC1/SC29/WG11 M14005, Oct. 2006, Hangzhou, China, Oct. 25, 2006, XP030042673.
Reznik Y et al: "Efficient fixed-point approximations of the 8x8 Inverse Discrete Cosine Transform" Applications of Digital Signal Processing XXX, Proceedings of SPIE, vol. 6696, Sep. 24, 2007, pp. 669617-1-669617-17, XP002489240 ISSN: 0277-786X.
Reznik Y et al: "idct Z1.c" C Code Submitted With Contribution Document M13650, Jul. 13, 2006, pp. 4, XP002605956.
Reznik Y et al: "idct_L1.c" C Code Submitted With Contribution Document M14168, Jan. 18, 2007, XP002606534.
Reznik, Y. et al.: "idct-z0a.c," C Code Submitted With Contribution Document M14531, (Apr. 21, 2007), XP002610523.
Reznik Y et al: "m13650.zip" Screenshot of Content of Compressed File M13650.ZIP, Jul. 13, 2006, XP002605957.
Reznik Y et al: "m14005.zip" Screenshot of Content of Compressed File M14005.ZIP, Oct. 25, 2006, XP002605953.
Reznik Y et al: "Response to CE on convergence of scaled and non-scaled IDCT architectures" ISO/IEC JTC1/SC29/WG11 M13650, Jul. 2006, Klagenfurt, Austria, Jul. 13, 2006, XP030042319.
Reznik Y: "m14167.zip" Screenshot of Content of Compressed File M14167.ZIP, Jan. 10, 2007, XP002606533.
Reznik Y: "Summary of core experiments on fixed-point IDCT/DCT" ISO/IEC JTC1/SC29/WG11 M14167, Jan. 2007, Marrakech, Marocco, Jan. 10, 2007, XP030042823.
Reznik, Yuriy: "m14506.zip," Screenshot of Content of Compressed File M14506.ZIP, (Apr. 19, 2007), XP002610525.
Reznik, Yuriy: "Summary of Core Experiments on fixed point IDCT/DCT, "ISO/IEC JTC1/SC29/WG11, MPEG2006/14506, San Jose, USA, (Apr. 27, 2009), XP030043143.
Seehyun Kim et al.; "Fixed-point error analysis and wordlength optimization of a distributed arithmetics based 8x8 2D-IDCT architecture"; 1996, Workshop on VLSI signal processing IX; 398-407.
Sullivan G: "Standardization of IDCT approximation behavior for video compression: the history and the new MPEG-C parts 1 and 2 standards" Applications of Digital Signal Processing XXX, Proceedings of SPIE, vol. 6696, Sep. 24, 2007, pp. 669611-1-669611-22, XP002489241 ISSN: 0277-786X.
Testform.zip file, sent on IDCT reflector [mpeg-vidct@lists.rwth-aachen.de] by Lijie Liu, 2005.
Trac D Tran et al: "FastVDO 16-bis IDCT proposal for CD" ISO/IEC JTCI/SC29/WG11 M13847, Sep. 2006, Hangzhou, China, Sep. 17, 2006, pp. 2, XP030042515.
Trac D Tran et al: "m13847.zip" Screenshot of Content of Compressed File M13847 .ZIP, Oct. 17, 2006, XP002605960.
Vassil Dimitrov et al.; "Multiplierless DCT algorithm for image compression applications"; vol. 11, No. 2, 2004, International Journal Information Theories & Applications, 162-169.
Video Subgroup: ISO-IEC-23002-2_(WD2). doc Working Draft Submitted With Output Document N8255, Jul. 21, 2006, pp. 1-19, XP002605958.
Video Subgroup: "23002-2-FCD-software.c," C Code Submitted With Output Document N8983, (May 19, 2007), XP002610521.
Video Subgroup: "Text of ISO/IEC FCD 23002-2: Information technology—MPEG video technologies—Part 2: Fixed-point 8x8 IDCT and DCT," ISO/IEC JTC 1/SC29/WG11, Apr. 27, 2007, San Jose, USA, retrieved (May 19, 2007), XP030015477.
Video Subgroup: "w8255.zip" Screenshot of Content of Compressed File W8255.ZIP, Jul. 21, 2006, XP002605959.
Video Subgroup: "w8983.zip", Screenshot of Content of Compressed File W8983.ZIP, (May 19, 2007), XP002610522.
Video Subgroup: "Working Draft 2.0 of ISO/IEC 23002-2 Fixed point IDCT and DCT" ISO/IEC JTC1/SC29/WG11 N8255, Jul. 2006, Klagenfurt, Austria, Jul. 21, 2006, XP030014747.
Zhibo Ni et al: "Cross-check of IDCT core experiments" (ISO/IEC JTC1/SC29/WG11 M14168, Jan. 2007, Marrakech, Marocco, Jan. 18, 2007, XP030042824.
Zhibo Ni et al: "m14168.zip" Screenshot of Content of Compressed File M14168.ZIP, Jan. 18, 2007, XP002606535.
Y. Arai, T. Agui, and M. Nakajima, "A Fast DCT-SQ Scheme for Images", Transactions of the IEICE E 71(11):1095, Nov. 1988.
Hinds, et al.: "On IDCT Exactness, Precision, and Draft Problem." International Organization for Staldardization ISO/IEC JTC1 SC29/WG11 Coding of Moving Pictures and Audio, No. M13657, pp. 1-15, Jul. 17, 2006 XP030042326.
Loeffler, et al.: "Practical fast 1-D DCT algorithms with 11 multiplications," 1989 International Conference On Acoustics, Speech, and Signal Processing, 1989 vol. 2, pp. 988-991, May 1989.
Reznik; "On Clipping and Dynamic range of variables in IDCT designs", ISO/IEC JTC/SC29 WG11 input document MPEG2006/M14004, Oct. 2006, Hangzhou China, pp. 1-8, XP030042672.
M. Vetterli and A. Ligtenberg, "A Discrete Fourier-Cosine Transform Chip," IEEE Journal on Selected Areas in Communications, vol. SAC-4, No. 1, Jan. 1986 pp. 49-61.
Zhou. et al..; "IDCT output range before clipping in MPEG video coding," Signal Processing: Image Communication, vol. 11 No. 2, pp. 137-145, Dec. 1997, XP004100330.
IEEE Std 1180-1990; "IEEE Standard Specifications for the Implementations of 8x8 Inverse Discrete Cosine Transform," IEEE CAS Standards Committee of the IEEE Circuits and Systems Society, pp. 1-13, Approved Dec. 6, 1990.
M12936: C-X Zhang and L.Yu, "Low complexity and High Fidelity Fixed-Point Multiplier-less DCT/IDCT Implementation Scheme," ISO/IEC JTC1/SC29/WG11 MPEG 2006/M12936, Jan. 2006. Bangkok, Thailand, pp. 1-10.
M13001: Yurly A, Reznik and Arianne T. Hinds, "Improved Proposal for MPEG Fixed-Point 8x8 IDCT Standard," ISO/IEC JTC1/SC29/WG11 MPEG2006/M13001, Jan. 2006, Bangkok, Thailand, pp. 1-22.
M13256: C-X Zhang and L. Yu, "Improved Fixed-Point DCT/IDCT Implementation Scheme with Low Complexity and High Fidelity," ISO/IEC JTC1/SC29/WG11 MPEG2006/M13256. Apr. 2006, Montreux, Switzerland, pp. 1-6.
M13299: Trac D. Tran, Lijie Liu, Pankaj Topiwala, "Improved High-Accuracy Multiplierless DCT/IDCT Based on the Lifting Scheme," ISO/IEC JTC1/SC29/WG11 MPEG2006/M13299, Apr. 2006, Montreux, Switzerland, pp. 1-5.
M13326: Yurly A. Reznik and Arianne T. Hinds, "Proposed Core Experiment on Exploration on Convergence of Scaled and Non-

(56) References Cited

OTHER PUBLICATIONS

Scaled IDCT Designs," ISO/IEC JTC1/SC29/WG11 MPEG2006/M13326, Apr. 2006, Montreux, Switzerland, pp. 1-9.

M13375: Michael A. Isnardi, "Description of Sample Bitstream for Testing IDCT Linearity," ISO/IEC JTC1/WG11 MPEG2006/M13375, Apr. 2006, Montreux, Switzerland, pp. 1-8.

ISO/IEC JTC1/SC29/WG11N7292 [11172-6 Study on FCD] Information—Coding of Moving Pictures and Associated Audio for Digital Storage Media at up to About 1.5 Mbit/s—Part 6: Specification of Accuracy Requirements for Implementation of Integer Inverse Discrete Cosine Transform, IEEE standard 1180-1190, pp. 1-14, Approved Dec. 6, 1990.

ISO/IEC JTC1/SC29/WG11 N7335, "Call for Proposals on Fixed-Point 8x8 IDCT and DCT Standard," pp. 1-18, Poznan, Poland, Jul. 2005.

ISO/IEC JTC 1/SC 29/WG11 N7815 [23002-1 FDIS] "Information technology—MPEG video technologies—Part 1: Accuracy requirements for implementation of interger-output 8x8 inverse discrete cosine transform," pp. 1-18, Jan. 20, 2006.

ISO/IEC JTC1/SC29/WG11 N7817 [23002-2 WD1] "Information technology—MPEG Video Technologies—Part 2: Fixed-point 8x8 IDCT and DCT Transforms," pp. 1-27, Jan. 19, 2006.

ISO/IEC 11172:1992 "Information Technology—Coding of moving pictures and associated audio for digital storage media at up to about 1.5 Mbit/s—Part 2—Video," pp. 1-222, Aug. 1, 1993.

ISO/IEC 14496-2:2001 "Information technology—Coding of audio-visual objects—Part2: Visual," Jul. 2001, Part1, pp. 1-249.

ISO/IEC 14496-2:2001 "Information technology—Coding of audio-visual objects—Part2: Visual," Jul. 2001, Part2, pp. 1-99.

ITU-T Recommendation H.263: "Series H: Audiovisual and multimedia systems—Infrastructure of Audiovisual services—coding of moving video—Video Coding for Low Bit Rate Communication," Jan. 2005, pp. 1-226.

MPEG-2 TM5 Encoder/Decoder, Version 1.2, Jul. 19, 1996, MPEG Software Simulation Group, Retrieved from http://www.mpeglorg/MPEG/MSSG/Codec/readme.txt.

XVID open source implementation of MPEG-4 ASP: http://downloads.xvid.org/downloads/xvidcore-1.1.0.tar.gz.

Aiyoshi E., "Handbook of Automatic Control", Ohmsha Ltd., Aug. 27, 1997, 1st ed., pp. 188-194.

Lampert, Christoph, et al., XVID open source implementation of MPEG-4 ASP; Apr. 3, 2005; <http://downloads.xvid.org/downloads/xvidcore-1.1.0.tar.gz>.

\* cited by examiner

REDUCTION OF ERRORS DURING COMPUTATION OF INVERSE DISCRETE COSINE TRANSFORM

This application claims the benefit of U.S. Provisional Application No. 60/816,697, filed Jun. 26, 2006, U.S. Provisional Application No. 60/841,362, filed Aug. 30, 2006, U.S. Provisional Application No. 60/847,194, filed Sep. 25, 2006, U.S. Provisional Application No. 60/829,669, filed Oct. 16, 2006, and U.S. Provisional Application No. 60/869,530, filed Dec. 11, 2006, the entire content of which are hereby incorporated by reference.

TECHNICAL FIELD

The disclosure relates to computer graphics and multimedia, and particularly to compression of graphics, images, and video information.

BACKGROUND

Many existing image and video coding standards employ compression techniques in order to allow high-resolution images and video to be stored or transmitted as a relatively compact files or data streams. Such coding standards include Joint Photographic Experts Group (JPEG), Moving Pictures Experts Group (MPEG)-1, MPEG-2, MPEG-4 part 2, H.261, H.263, and other image or video coding standards.

In accordance with many of these standards, video frames are compressed using "spatial" encoding. These frames may be original frames (i.e., i-frames) or may be residual frames generated by a temporal encoding process that uses motion compensation. During spatial encoding, frames are broken into equal sized blocks of pixels. For example, an uncompressed frame may be broken into a set of 8×8 blocks of pixels. For each block of pixels, pixel components are separated into matrixes of pixel component values. For example, each block of pixels may be divided into a matrix of Y pixel component values, a matrix of U pixel component values, and a matrix of V pixel component values. In this example, Y pixel component values indicate luminance values and U and V pixel component values represent chrominance values.

Furthermore, during spatial encoding, a forward discrete cosine transform (FDCT) is applied to each matrix of pixel component values in a frame that is being encoded. An ideal one-dimensional FDCT is defined by:

$$t(k) = c(k) \sum_{n=0}^{N-1} s(n) \cos \frac{\pi(2n+1)k}{2N}$$

where s is the array of N original values, t is the array of N transformed values, and the coefficients c are given by $$c(0) = \sqrt{1/N},\ c(k) = \sqrt{2/N}$$

for $1 \leq k \leq N-1$.

An ideal two-dimensional FDCT is defined by the formula:

$$t(i, j) = c(i, j) \sum_{n=1}^{N-1} \sum_{m=0}^{N-1} s(m, n) \cos \frac{\pi(2m+1)i}{2N} \cos \frac{\pi(2n+1)j}{2N}$$

where s is the array of N original values, t is the array of N transformed values, and c(i,j) is given by c(i,j)=c(i)c(j), and with c(k) defined as in the one-dimensional case.

A matrix of coefficients is produced when the block of pixel component values is transformed using the FDCT. This matrix of coefficients may then be quantized and encoded using, for example, Huffman or arithmetic codes. A video bitstream represents the combined result of performing this process on all blocks of pixel component values in a series of video frames in an uncompressed series of video frames.

An uncompressed video frame may be derived from a video bitstream by reversing this process. In particular, to each matrix of coefficients in the bitstream is decompressed and the decompressed values are de-quantized in order to derive matrixes of transformed coefficients. An inverse discrete cosine transform ("IDCT") is then applied to each matrix of transformed coefficients in order to derive matrixes of pixel component values. An ideal one-dimensional IDCT is defined by:

$$s(n) = \sum_{k=0}^{N-1} c(k) t(k) \cos \frac{\pi(2n+1)k}{2N}$$

where s is the array of N original values, t is the array of N transformed values, and the coefficients c are given by $$c(0) = \sqrt{1/N},\ c(k) = \sqrt{2/N}$$

for $1 \leq k \leq N-1$.

An ideal two-dimensional IDCT is defined by the formula:

$$s(m, n) = \sum_{i=0}^{N-1} \sum_{j=0}^{N-1} c(i, j) t(i, j) \cos \frac{\pi(2m+1)i}{2N} \cos \frac{\pi(2n+1)j}{2N}$$

The resulting matrixes of pixel component values are then reassembled into blocks of pixels and these blocks of pixels are be reassembled to form a decoded frame. If the decoded frame is an i-frame, the frame is now completely decoded. However, if the uncompressed frame is a predictive or a bi-predictive frame, the decoded frame is merely a decoded residual frame. A completed frame is generated by constructing a reconstructed frame using motion vectors associated with the decoded frame and then adding the reconstructed frame to the decoded residual frame.

Under ideal circumstances, no information is lost by using an FDCT to encode or an IDCT to decode a block of pixel component values. Consequently, under these ideal circumstances, a decoded version of a video frame is identical to the original version of the video frame. However, computing an FDCT or an IDCT may be computationally difficult because the computation of FDCTs and IDCTs involve the use of real numbers and significant numbers of multiplication operations. For this reason, real numbers used in FDCTs and IDCTs are frequently approximated using limited precision numbers. Rounding errors result from using limited precision numbers to represent real number values. Furthermore, quantization and dequantization may contribute additional errors.

Errors in the compression and decompression process may result in significant differences between the original uncompressed frame and the final uncompressed frame. For example, colors in the final uncompressed frame may differ from colors in the original uncompressed frame. Furthermore, errors caused by a mismatch between the encoder's implementation of the IDCTs and the decoder's implementation of the IDCT may accumulate during the encoding and decoding of sequences of predicted frames. These accumulated errors are commonly referred to as "IDCT drift".

SUMMARY

Techniques are described to reduce rounding errors during computation of discrete cosine transform using fixed-point calculations. According to these techniques, a matrix of scaled coefficients is calculated by multiplying coefficients in a matrix of coefficients by scale factors. Next, a midpoint bias value and a supplemental bias value are added to a DC coefficient of the matrix of scaled coefficients. Next, an inverse discrete cosine transform is applied to the resulting matrix of scaled coefficients. Values in the resulting matrix are then right-shifted in order to derive a matrix of pixel component values. As described herein, the addition of the supplemental bias value to the DC coefficient reduces rounding errors attributable to this right-shifting. As a result, a final version of a digital media file decompressed using these techniques may more closely resemble an original version of a digital media file.

In one aspect, a method comprises generating a matrix of biased coefficients by adding one or more bias values to a coefficient of a matrix of source coefficients. The method also comprises generating a matrix of transformed coefficients by using fixed-point arithmetic to repeatedly apply a one-dimensional transform to coefficients in the matrix of biased coefficients. In addition, the method comprises generating a matrix of output coefficients by right-shifting coefficients in the matrix of transformed coefficients. Coefficients in the matrix of output coefficients are approximations of values that would be produced by transforming the matrix of source coefficients using an ideal inverse discrete cosine transform. The method also comprises causing a media presentation unit to output audible or visible signals based on the matrix of output values. The addition of the bias values to the coefficient causes positive errors and negative errors to be, on average, equal in magnitude and to be, on average, symmetric about zero. The errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

In another aspect, a device comprises a coefficient biasing module that generates a matrix of biased coefficients by adding one or more bias values to a coefficient of the matrix of source coefficients. The device also comprises an inverse transform module that generates a matrix of transformed coefficients by using fixed-point arithmetic to repeatedly apply a one-dimensional transform to coefficients in the matrix of biased coefficients. In addition, the device comprises a right-shift module that generates a matrix of output coefficients by right-shift coefficients in the matrix of transformed coefficients. Coefficients in the matrix of output coefficients are approximations of values that would be produced by transforming the matrix of source coefficients using an ideal inverse discrete cosine transform. The device also comprises a presentation driver that causes a media presentation unit to output audible or visible signals based on the matrix of output coefficients. The addition of the bias values to the coefficient causes positive errors and negative errors to be, on average, equal in magnitude and to be, on average, symmetric about zero. The errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

In another aspect, a device comprises means for generating a matrix of biased coefficients by adding one or more bias values to a coefficient of a matrix of source coefficients. The device also comprises means for generating a matrix of transformed coefficients by using fixed-point arithmetic to repeatedly apply a one-dimensional transform to coefficients in the matrix of biased coefficients. In addition, the device comprises means for generating a matrix of output coefficients by right-shifting coefficients in the matrix of transformed coefficients. Coefficients in the matrix of output coefficients are approximations of values that would be produced by transforming the matrix of source coefficients using an ideal inverse discrete cosine transform. The device also comprises means for causing a media presentation unit to output audible or visible signals based on the matrix of output values. The addition of the bias values to the coefficient causes positive errors and negative errors to be, on average, equal in magnitude and to be, on average, symmetric about zero. The errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

In another aspect, the invention is directed to a computer-readable medium comprising instructions. Upon execution the instructions cause a processor to generate a matrix of biased coefficients by adding one or more bias values to a coefficient of a matrix of source coefficients. The instructions also cause the processor to generate a matrix of transformed coefficients by using fixed-point arithmetic to repeatedly apply a one-dimensional transform to coefficients in the matrix of biased coefficients. In addition, after causing the processor to generate a matrix of output coefficients by right-shifting coefficients in the matrix of transformed coefficients. Coefficients in the matrix of output coefficients are approximations of values that would be produced by transforming the matrix of source coefficients using an ideal inverse discrete cosine transform. The instructions also cause a media presentation unit to output audible or visible signals based on the matrix of output values. The addition of the bias values to the coefficient causes positive errors and negative errors to be, on average, equal in magnitude and to be, on average, symmetric about zero. The errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

In another aspect, a method comprises generating a matrix of adjusted coefficients by left-shifting each coefficient in a matrix of source coefficients. The method also comprises generating a matrix of transformed coefficients by using fixed-point arithmetic to repeatedly apply a one-dimensional transform to coefficients in the matrix of adjusted coefficients. In addition, the method comprises generating a matrix of scaled coefficients by scaling each coefficient in the matrix of transformed coefficients. Furthermore, the method comprises generating a matrix of biased coefficients by adding one or more bias values to one or more coefficients in the matrix of scaled coefficients. The method also comprises generating a matrix of output coefficients by right-shifting coefficients in the matrix of biased coefficients by a first magnitude. The matrix of source coefficients represents media data. Coefficients in the matrix of output coefficients are approximations of values that would be produced by transforming the matrix of source coefficients using an ideal forward discrete cosine transform. The addition of the bias values to the coefficient causes positive errors and negative errors to be, on average, equal in magnitude and to be, on average, symmetric about zero. The errors represent differences between values that result from right-shifting limited precision fixed-point representations of coefficients in the matrix of biased coefficients by the first magnitude and results from dividing the coefficients in the matrix of biased coefficients by 2 raised to the power of the first magnitude, without regard to precision.

In another aspect, a device comprises a left-shift module that generates a matrix of adjusted coefficients by left-shifting each coefficient in a matrix of source coefficients. The device also comprises a forward transform module that generates a matrix of transformed coefficients by using fixed-point arithmetic to repeatedly apply a one-dimensional transform to coefficients in the matrix of adjusted coefficients. In addition, the device comprises a scaling module that generates a matrix of scaled coefficients by scaling each coefficient in the matrix of transformed coefficients. The device also comprises a coefficient biasing module that generates a matrix of biased coefficients by adding one or more bias values to one or more coefficients in the matrix of scaled coefficients. Furthermore, the device comprises a right-shift module that generates a matrix of output coefficients by right-shifting coefficient in the matrix of biased coefficients by a first magnitude. The matrix of source coefficients represents media data. Coefficients in the matrix of output coefficients are approximations of values that would be produced by transforming the matrix of source coefficients using an ideal forward discrete cosine transform. The addition of the bias values to the coefficient causes positive errors and negative errors to be, on average, equal in magnitude and to be, on average, symmetric about zero. The errors represent differences between values that result from right-shifting limited precision fixed-point representations of coefficients in the matrix of biased coefficients by the first magnitude and results from dividing the coefficients in the matrix of biased coefficients by 2 raised to the power of the first magnitude, without regard to precision.

In another aspect, a device comprises means for generating a matrix of adjusted coefficients by left-shifting each coefficient in a matrix of source coefficients. The device also comprises means for generating a matrix of transformed coefficients by using fixed-point arithmetic to repeatedly apply a one-dimensional transform to coefficients in the matrix of adjusted coefficients. In addition, the device comprises means for generating a matrix of scaled coefficients by scaling each coefficient in the matrix of transformed coefficients. The device also comprises means for generating a matrix of biased coefficients by adding one or more bias values to one or more coefficients in the matrix of scaled coefficients. Furthermore, the device comprises means for generating a matrix of output coefficients by right-shifting coefficient in the matrix of biased coefficients by a first magnitude. The matrix of source coefficients represents media data. Coefficients in the matrix of output coefficients are approximations of values that would be produced by transforming the matrix of source coefficients using an ideal forward discrete cosine transform. The addition of the bias values to the coefficient causes positive errors and negative errors to be, on average, equal in magnitude and to be, on average, symmetric about zero. The errors represent differences between values that result from right-shifting limited precision fixed-point representations of coefficients in the matrix of biased coefficients by the first magnitude and results from dividing the coefficients in the matrix of biased coefficients by 2 raised to the power of the first magnitude, without regard to precision.

In another aspect, a computer-readable medium comprises instructions. The instructions cause a programmable processor to generate a matrix of adjusted coefficients by left-shifting each coefficient in a matrix of source coefficients. The instructions also cause the processor to generate a matrix of transformed coefficients by using fixed-point arithmetic to repeatedly apply a one-dimensional transform to coefficients in the matrix of adjusted coefficients. In addition, the instructions cause the processor to generate a matrix of scaled coefficients by scaling each coefficient in the matrix of transformed coefficients. In addition, the instructions cause the processor to generate a matrix of biased coefficients by adding one or more bias values to one or more coefficients in the matrix of scaled coefficients. The instructions also cause the processor to generate a matrix of output coefficients by right-shifting coefficients in the matrix of biased coefficients by a first magnitude. The matrix of source coefficients represents media data. Coefficients in the matrix of output coefficients are approximations of values that would be produced by transforming the matrix of source coefficients using an ideal forward discrete cosine transform. The addition of the bias values to the coefficient causes positive errors and negative errors to be, on average, equal in magnitude and to be, on average, symmetric about zero. The errors represent differences between values that result from right-shifting limited precision fixed-point representations of coefficients in the matrix of biased coefficients by the first magnitude and results from dividing the coefficients in the matrix of biased coefficients by 2 raised to the power of the first magnitude, without regard to precision.

In some cases, the computer-readable medium may form part of a computer program product, which may be sold to manufacturers and/or used in a device. The computer program product may include the computer-readable medium, and in some cases, may also include packaging materials.

The details of one or more examples are set forth in the accompanying drawings and the description below. Other features, objects, and advantages of the invention will be apparent from the description and drawings, and from the claims.

DETAILED DESCRIPTION

Figure 1:
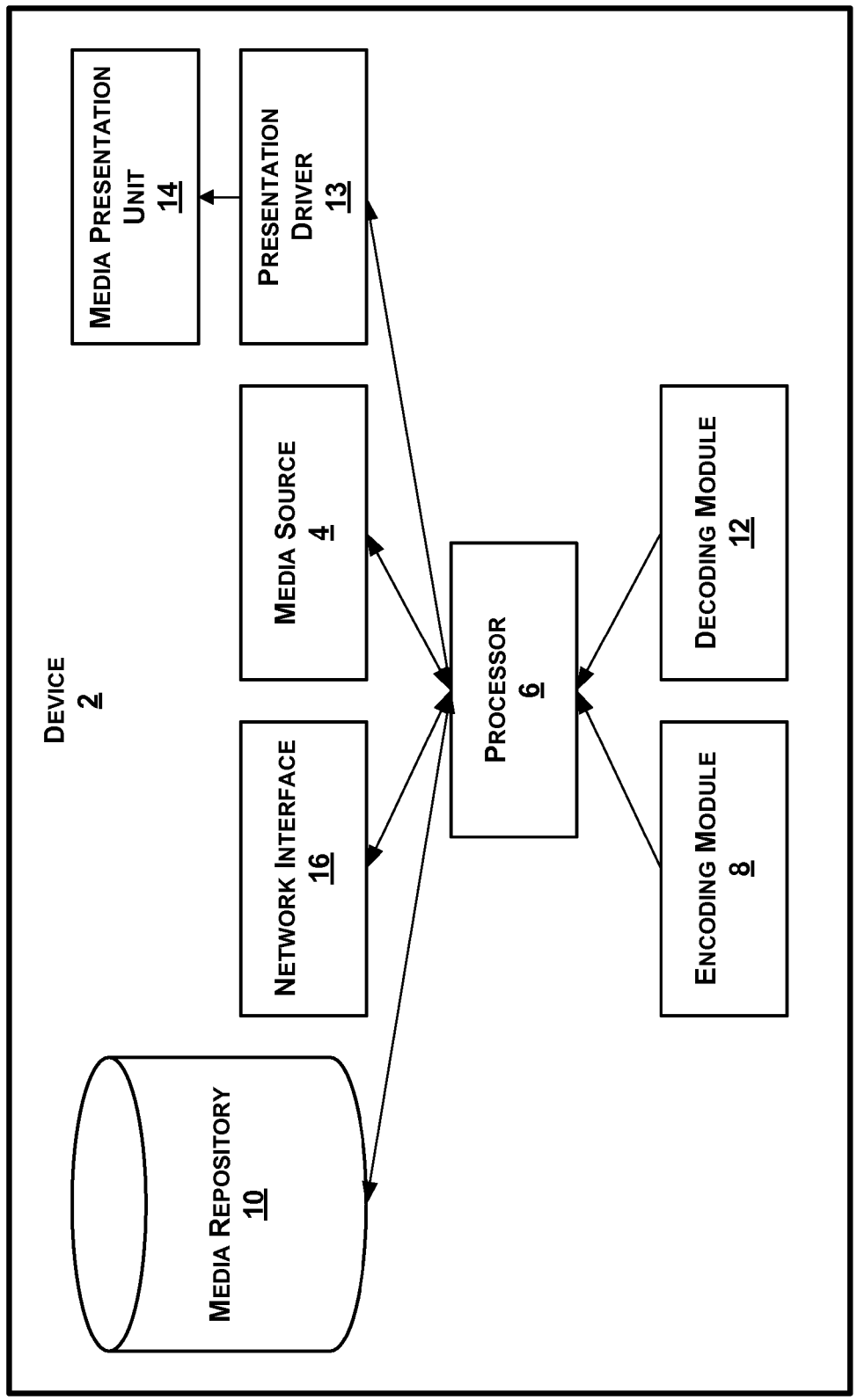
FIG. 1 is a block diagram illustrating an exemplary device that encodes and decodes media files.

FIG. 1 is a block diagram illustrating an exemplary device 2 that encodes and decodes media files. Device 2 may comprise a personal computer, a mobile radiotelephone, a server, a network appliance, a computer integrated into a vehicle, a video gaming platform, a portable video game device, a computer workstation, a computer kiosk, digital signage, a mainframe computer, a television set-top box, a network telephone, a personal digital assistant, a video game platform, a mobile media player, a home media player, digital video projector, a personal media player (e.g., an iPod), or another type of electronic device.

Device 2 may include a media source 4 to generate media data. Media source 4 may comprise a digital video or still photo camera to capture image data. Media source 4 may be built into device 2 or may be attached to device 2 as a peripheral device. Media source 4 may also comprise a microphone to record audio data. Media source 4 may provide media data to a processor 6. Processor 6 may comprise a digital signal processor ("DSP"), a microprocessor, or some other type of integrated circuit.

When processor 6 receives media data from media source 4, an encoding module 8 may encode the media data. Encoding module 8 may comprise software executed by processor 6. Alternatively, encoding module 8 may comprise specialized hardware within processor 6 that encodes the media data. In still another alternative, encoding module 8 may comprise any combination of software and hardware to encode the media data.

Encoding module 8 may store the encoded media data in a media repository 10. Media repository 10 may comprise flash memory, random access memory, a hard disk drive, or some other type of volatile or non-volatile data storage unit.

A decoding module 12 may retrieve encoded media data from media repository 10. Decoding module 12 may comprise software executed by processor 6. Alternatively, decoding module 12 may comprise specialized hardware within processor 6 that decodes the encoded media data. In still another alternative, decoding module 12 may comprise a combination of software and hardware that collaborate to decode the encoded media data.

A presentation driver 13 in device 2 causes a media presentation unit 14 to present media data decoded by decoding module 12. For example, media presentation unit 14 may comprise a computer monitor that presents image or video media data. In another example, media presentation unit 14 may comprise an audio output device (e.g., a speaker) that presents audio media data. Media presentation unit 14 may be integrated into device 2 or may be connected via a wired or wireless link to device 2 as a peripheral device. Presentation driver 13 may comprise a device driver or other software, a hardware or firmware unit, or some other mechanism that causes media presentation unit 14 to present media data.

Device 2 may also comprise a network interface 16. Network interface 16 may facilitate communication between device 2 and a computer network via a wired or wireless link. For example, network interface 16 may facilitate communication between device 2 and a mobile telephone network. Device 2 may receive media files via network interface 16. For example, device 2 may receive photographs, video clips, streaming video (e.g., television, video conference, movies), audio clips (e.g., ringtones, songs, MP3 files), streaming audio (e.g., digital radio stations, voice calls, etc.) through network interface 16. When network interface 16 receives a media file or video bitstream, network interface 16 may store the media file or video bitstream in media repository 10.

A video signal may be described in terms of a sequence of pictures, which include frames (an entire picture), or fields (e.g., a picture that comprises either odd or even lines of a frame). Further, each frame or field may include two or more slices, or sub-portions of the frame or field. As used herein, either alone or in combination with other words, the term "frame" may refer to a picture, a frame, a field or a slice thereof.

When encoding module 8 encodes a series of video frames, encoding module 8 may start by selecting ones of the video frames to be "i-frames." For instance, encoding module 8 may select every eighth frame as an i-frame. I-frames are frames that do not reference other frames. After selecting the i-frames, encoding module 8 uses "spatial encoding" to encode the i-frames. Furthermore, encoding module 8 may use "temporal encoding" to encode the remaining frames.

To use spatial encoding to encode a frame, encoding module 8 may break the frame data into blocks of pixels. For example, encoding module 8 may break the frame data into blocks of pixels that are eight pixels wide and eight pixels high (i.e., each block of pixels contains 64 pixels). Encoding module 8 may then separate pixel component values of the pixels in each block of pixels into separate matrixes of pixel component values. The pixel component values of a pixel are the values that characterize the appearance of the pixel. For example, each pixel may specify a Y pixel component value, a Cr pixel component value, and a Cb pixel component value. The Y pixel component value indicates the luminance of the pixel, the Cr pixel component value indicates the red chrominance of the pixel, and the Cb pixel component value indicates the blue chrominance of the pixel. In this example, when encoding module 8 separates the pixel component values of a block of pixels, encoding module 8 may obtain a matrix of Y pixel component values, a matrix of Cr pixel component values, and a matrix of Cb pixel component values.

After separating the pixel component values into matrixes of pixel component values, encoding module 8 generates a matrix of transformed coefficients for each of the matrixes of pixel component values. Encoding module 8 may generate a matrix of transformed coefficients for a matrix of pixel component values by first generating a matrix of adjusted coefficients by left-shifting pixel component values in a matrix of pixel component values. Encoding module 8 then uses fixed-point arithmetic to repeatedly apply a one-dimensional transform to the matrix of adjusted coefficients, thereby generating a matrix of coefficients. In some implementations, encoding module 8 may then generate the matrix of transformed coefficients by scaling the matrix of transformed coefficients by a set of scale factors. Each of these scale factors is an integer value. The scale factors have been selected in such a way that factors within the one-dimensional transform may be approximated using simple rational numbers. In implementations that do not use scaling, the matrix of coefficients generated by applying the transform is the matrix of transformed coefficients.

Each coefficient in the matrix of transformed coefficients approximates a corresponding value in a matrix of values that would be produced by applying an ideal two-dimensional forward discrete cosine transform ("FDCT") to the matrix of encoded coefficients. An ideal one-dimensional FDCT is defined by:

$$t(k) = c(k) \sum_{n=0}^{N-1} s(n) \cos \frac{\pi(2n+1)k}{2N}$$

where s is the array of N original values, t is the array of N transformed values, and the coefficients c are given by $$c(0) = \sqrt{1/N}, \; c(k) = \sqrt{2/N}$$

for $1 \leq k \leq N-1$.

An ideal two-dimensional FDCT is defined by the formula:

$$t(i, j) = c(i, j) \sum_{n=1}^{N-1} \sum_{m=0}^{N-1} s(m, n) \cos \frac{\pi(2m+1)i}{2N} \cos \frac{\pi(2n+1)j}{2N}$$

where s is the array of N original values, t is the array of N transformed values, and c(i,j) is given by c(i,j)=c(i)c(j), and with c(k) defined as in the one-dimensional case.

After deriving a matrix of transformed coefficients, encoding module 8 generates a matrix of quantized coefficients by quantizing the coefficients in the matrix of transformed coefficients. Quantizing the transformed coefficients may reduce the amount of information associated with high-frequency coefficients in the matrix of transformed coefficients. After generating the matrix of quantized coefficients, encoding module 8 may apply an entropy encoding scheme to the matrix of quantized coefficients. For example, encoding module 8 may apply a Huffman encoding scheme to the quantized coefficients in the matrix of coefficients. When encoding module 8 applies the entropy encoding scheme to each of matrixes of quantized coefficients, encoding module 8 may output the encoded matrixes as a part of a video bitstream.

To use temporal encoding to encode a frame, encoding module 8 may divide the frame into "macroblocks". Depending on the coding standard used, these macroblocks may be of fixed or variable size and may be overlapping or non-overlapping. For example, each macroblock may be a 16×16 block of pixels. For each macroblock in the frame, encoding module 8 may attempt to identify a source macroblock in one or more reference frames. Depending on the coding standard, the reference frames may be i-frames, predictive frames, or bi-predictive frames. If encoding module 8 is able to identify a source macroblock in a reference frame, encoding module 8 records a motion vector for the macroblock. The motion vector includes an x value that indicates the horizontal displacement of the macroblock relative to the identified source macroblock and ay value that indicates the vertical displacement of the macroblock relative to the identified source macroblock. If encoding module 8 is unable to identify a source macroblock for the macroblock, encoding module 8 may not be required to record a motion vector for the macroblock. Next, encoding module 8 generates a "reconstructed" frame. The reconstructed frame contains the frame that would result from moving the macroblocks from the reference frames in accordance with the recorded motion vectors for the current frame. After generating the reconstructed frame, encoding module 8 subtracts pixel component values in each pixel of the reconstructed frame from corresponding pixel component values in corresponding pixels of the current frame, resulting in a "residual" frame. Encoding module 8 may then use an entropy encoding scheme to compress the motion vectors for the macroblocks of the current frame. In addition, encoding module 8 uses the spatial encoding technique described above to compress the residual frame.

Decoding module 12 may perform a similar process as encoding module 8, but in reverse. For instance, in order to perform a spatial decoding process, decoding module 12 may apply an entropy decoding scheme to each encoded matrix of quantized coefficients in an encoded video bitstream. Decoding module 12 may then de-quantize coefficients in each matrix of quantized coefficients, thereby generating a matrix of de-quantized coefficients for each matrix of quantized coefficients. For each matrix of quantized coefficients, decoding module 12 generates a matrix of scaled coefficients by scaling the matrix of quantized coefficients.

After generating the matrix of scaled coefficients, decoding module 12 generates a matrix of biased coefficients by adding a midpoint bias value and a supplemental bias value to the DC coefficient of the matrix. The DC coefficient of the matrix is a coefficient that is equal the mean value of the other coefficients in the matrix. Typically, the DC coefficient is the coefficient at the top left corner of the matrix. As described in detail below, the addition of the bias values to the DC coefficient may reduce rounding errors when decoding module 12 right-shifts values produced by applying the inverse discrete cosine transform factorization to each row and column of the matrix. These rounding errors may be attributable to the fact that these right-shifts are substitutes for more computationally-expensive division operations and that right shift operations in fixed-point arithmetic do not always produce the same results as division operations.

After decoding module 12 generates the matrix of biased coefficients, decoding module 12 uses fixed-point arithmetic to generate a matrix of transformed coefficients for the matrix of biased coefficients. Decoding module 12 generates the matrix of transformed coefficients by repeatedly applying a one-dimensional transform to the matrix of biased coefficients. For example, decoding module 12 may generate a matrix of intermediate coefficients by applying the one-dimensional transform to each row vector of the matrix of biased coefficients. In this example, decoding module 12 may then generate the matrix of transformed coefficients by applying the one-dimensional transform to each column vector in the matrix of intermediate coefficients.

Decoding module 12 may apply this one-dimensional transform using a series of "butterfly structure operations." In general, a "butterfly structure operation" refers to an operation in which a first intermediate value is produced by multiplying a first input value by a first constant, a second intermediate value is produced by multiplying the first input value by a second constant, a third intermediate value is produced by multiplying a second input value by the first constant, a fourth intermediate value is produced by multiplying the second input value by the second constant, a first output value is produced by adding the first intermediate value and the third intermediate value, and a second output value is produced by adding the second intermediate value and the negative of the fourth intermediate value. In a butterfly operation, the constants may be any rational or irrational number, including one. Example butterfly structure operations are shown in the transforms illustrated in the examples of FIGS. 10, 11, and 12.

In systems that have limited numbers of bits available to represent numbers, it may be impractical to perform multiplications by irrational constants in the butterfly structure operations. For this reason, decoding module 12 may approximate multiplications by irrational constants by multiplying values by rational fractions that approximate the irrational constants. In order to efficiently multiply a value by a rational fraction, decoding module 12 may multiply the value by the numerator of the rational fraction and then right-shift the resulting values by the $\log_2$ of the denominator of the rational fraction. As mentioned above, right-shift operations may cause rounding errors because right-shift operations in fixed-point arithmetic do not always produce results that are equal to corresponding division operations.

As explained in detail below, decoding module 12 may use negative numerators in some of the rational fractions in order to reduce rounding errors. Use of negative numerators may obviate the need to add midpoint bias values prior to right-shifting values. This may be advantageous because adding midpoint bias values may add unnecessary complexity to the application of the inverse discrete cosine transform.

When decoding module 12 has generated the matrix of transformed coefficients, decoding module 12 generates a matrix of adjusted coefficients by right-shifting each coefficient in the matrix of transformed coefficients by a number of positions equal to the number of bits added by applying the transform plus the number of bits added by scaling the coefficients of the matrix of de-quantized coefficients. Decoding module 12 may then generate a matrix of clipped coefficients by clipping the coefficients in the matrix of adjusted coefficients. Clipping the coefficients in the matrix of adjusted coefficients modifies the adjusted coefficients such that they are within the permitted range for a pixel component value. Hence, the matrix of clipped coefficients may be characterized as a matrix of pixel component values.

After generating the matrix of pixel component values, decoding module 12 may generate a block of pixels by combining the matrix of pixel component values with matrixes that store other pixel component values for the block of pixels. Next, decoding module 12 may combine blocks of pixels into a video frame.

In order to decode a predictive frame, decoding module 12 may use the spatial decoding technique described above to decode the matrixes of quantized coefficients in the residual image for the predictive frame. In addition, decoding module 12 may use the entropy decoding scheme to decode the motion vectors of the predictive frame. Next, decoding module 12 may generate a reconstructed frame by "moving" macroblocks of the reference frames of the predictive frame in accordance with the motion vectors. After generating the reconstructed frame, decoding module 12 adds pixel component values in each pixel of the decoded residual frame to corresponding pixel component values in corresponding pixels of the reconstructed frame. The result of this addition is the reconstructed predictive frame.

The techniques described in this disclosure may provide several advantages. For example, reduction of rounding errors during computation of discrete cosine transforms and inverse discrete cosine transforms may reduce the visible errors in image data and may reduce audible errors in audio data. Furthermore, because these techniques may apply to fixed-point calculations, these techniques may be applied in smaller, less complex devices, such as mobile telephones, personal digital assistants, and personal media players. In particular, the techniques may be applied using fixed-point numbers that have a very limited number of bits in their mantissa portions (e.g., three bits) while still complying with precision requirements specified by the Institute of Electrical and Electronics Engineers (IEEE) standard 1180, the entire content of which is hereby incorporated by reference. In addition, these techniques may be applied to formats that include International Telecommunication Union Standardization Sector (ITU-T) recommendations H.261, H.263, H.264, T.81 (JPEG), as well as International Organization for Standardization (ISO)/MEC Moving Pictures Experts Group (MPEG)-1, MPEG-2, and MPEG-4 Part 2 media formats.

Figure 2:
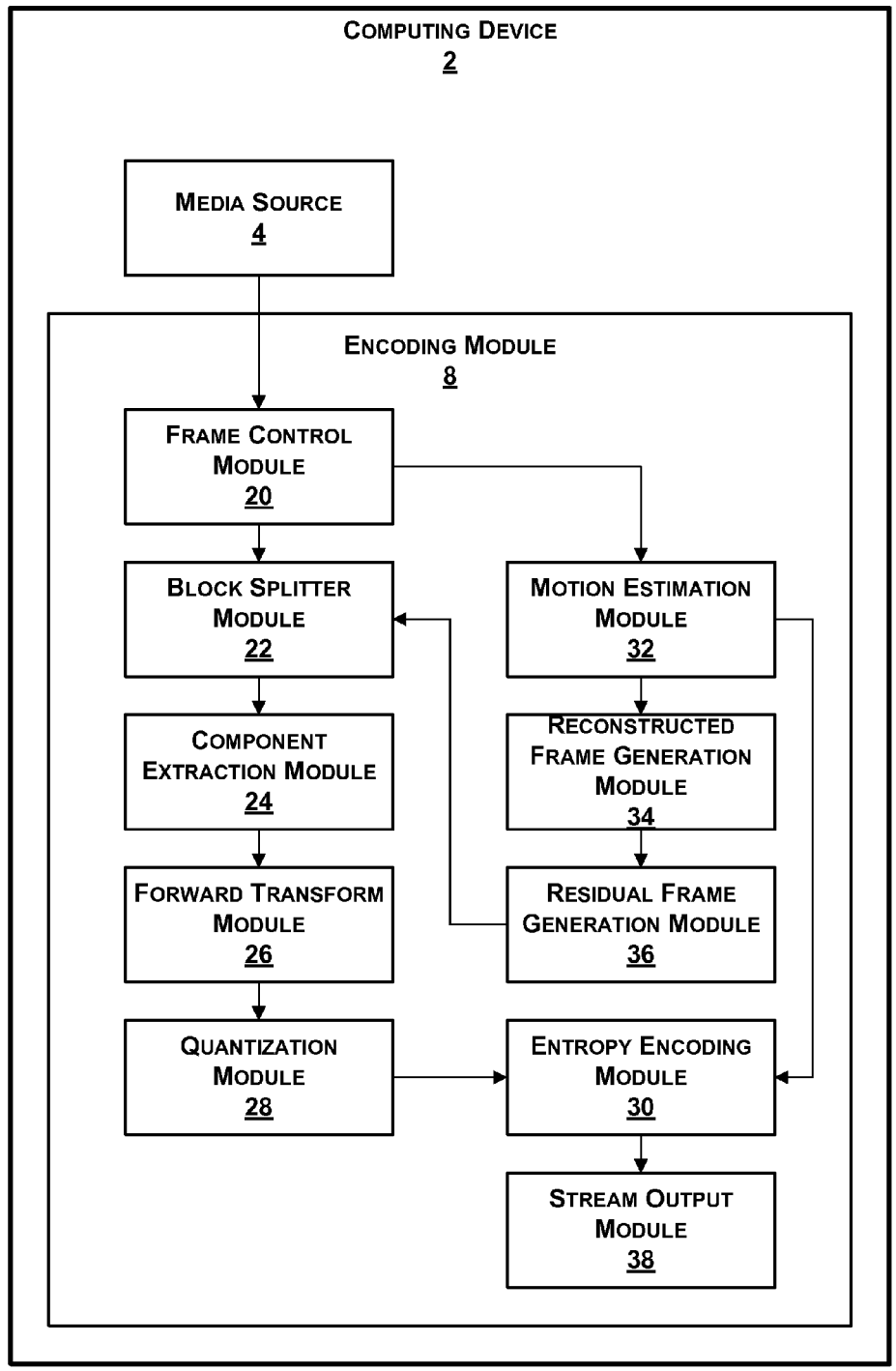
FIG. 2 is a block diagram illustrating exemplary details of an encoding module.

FIG. 2 is a block diagram illustrating example details of encoding module 8. Encoding module 8 may comprise a set of "modules." These modules may comprise subsets of the software instructions of encoding module 8. Alternatively, these modules may comprise special-purpose hardware. In another alternative, these modules may comprise software instructions and special-purpose hardware.

As illustrated in the example of FIG. 2, encoding module 8 includes a frame control module 20 that controls whether encoding module 8 processes a video frame as an i-frame, a predictive frame, or a bi-predictive frame. For instance, when encoding module 8 receives a video frame, frame control module 20 may determine whether a bitstream flag associated with the video frame indicates that the frame is an i-frame, a predictive frame, or a bi-prodictive frame. If frame control module 20 determines that the bitstream flag indicates that the frame is an i-frame, frame control module 20 may cause the video frame to be processed by a set of modules that immediately perform spatial encoding on the video frame. On the other hand, if frame control module 20 determines that the frame is a predictive frame or a bi-predictive frame, frame control module 20 may cause the video frame to be processed by a set of modules that perform temporal encoding.

Encoding module 8 includes a series of modules to apply spatial encoding to video frames. These modules include a block splitter module 22, a component extraction module 24, a forward transform module 26, a quantization module 28, and an entropy encoding module 30. Block splitter module 22 may receive unencoded video frames from media source 4, network interface 16, or another source. When block splitter module 22 receives an unencoded video frame, block splitter module 22 may separate the frame into blocks of pixels. Block splitter module 22 may provide blocks of pixels to a component extraction module 24.

When component extraction module 24 receives a block of pixels, component extraction module 24 may convert pixel component values of each pixel into a different color format. For example, component extraction module 24 may convert each pixel from a Red-Green-Blue (RGB) color format to the YCrCb color format. After converting the pixels in the block to the different color format, component extraction module 24 may separate the pixel component values of the pixels in the block into matrixes of pixel component values. For example, component extraction module 24 may extract a matrix of Y values, a matrix of Cr values, and a matrix of Cb values from one block of pixels. The Y values specify the brightness of pixels, Cr values specify red chrominance of pixels, and the Cb values specify blue chrominance of pixels. When component extraction module 24 has extracted the matrixes of pixel component values, component extraction module 24 may provide each of the matrixes separately to a forward transform module 26.

When forward transform module 26 receives a matrix of pixel component values, forward transform module 26 generates a matrix of transformed coefficients. Each coefficient in this matrix of scaled coefficients approximates a coefficient that would be produced by using an ideal forward discrete cosine transform to transform the matrix of pixel component values.

Forward transform module 26 uses fixed-point arithmetic to apply a one-dimensional transform to the matrixes of pixel component values. Using fixed-point arithmetic may be advantageous in some circumstances. For instance, smaller devices, such as mobile telephones might not include a floating point unit required to perform floating point arithmetic. Forward transform module 26 may begin a process of generating the matrix of scaled coefficients by left-shifting each of the pixel component values. For instance, forward transform module 26 may generate a matrix of adjusted coefficients by left-shifting each of the pixel component values by a number of bits of precision (i.e., the number of mantissa bits) of fixed-point representations of numbers that forward transform module 26 uses when applying the one-dimensional transform plus a number of bits of precision removed by scaling the transformed coefficients that result from applying the transform. After left-shifting each of the pixel-component values, forward transform module 26 may perform the transform on each of the row vectors of the matrix of adjusted coefficients. Performing a discrete cosine transform on each of the row vectors of the matrix of adjusted coefficients generates a matrix of intermediate coefficients. Next, forward transform module 26 may perform the transform on each of the column vectors of the matrix of intermediate coefficients. Performing the transform on each of the column vectors of the matrix of intermediate coefficients results in a matrix of transformed coefficients.

After generating the matrix of transformed coefficients, forward transform module 26 scales transformed coefficients at different positions in the matrix of transformed coefficients by different scale factors. As described below, decoding module 12 may use the reciprocals of these scale factors in the application of an inverse transform. When forward transform module 26 has finished scaling the transformed coefficients by the scale factors, forward transform module 26 may output the resulting matrix of scaled coefficients to quantization module 28.

When quantization module 28 receives a matrix of coefficients from forward transform module 26, quantization module 28 may quantize the scaled coefficients. Quantization module 28 may quantize the scaled coefficients in a variety of ways depending on the coding standard being employed. For example, in accordance with the MPEG-4 part 2 standard, quantization module 28 may use the following quantization matrix to quantize coefficients in a matrix of scaled coefficients for an i-frame:

| 8  | 17 | 18 | 19 | 21 | 23 | 25 | 27 |
|----|----|----|----|----|----|----|----|
| 17 | 18 | 19 | 21 | 23 | 25 | 27 | 28 |
| 20 | 21 | 22 | 23 | 24 | 26 | 28 | 30 |
| 21 | 22 | 23 | 24 | 26 | 28 | 30 | 32 |
| 22 | 23 | 24 | 26 | 28 | 30 | 32 | 35 |
| 23 | 24 | 26 | 28 | 30 | 32 | 35 | 38 |
| 25 | 26 | 28 | 30 | 32 | 35 | 38 | 41 |
| 27 | 28 | 30 | 32 | 35 | 38 | 41 | 45 |

Furthermore, in this example, quantization module 28 may use the following quantization matrix to quantize coefficients in a matrix of scaled coefficients for a predictive or bi-predictive frame:

| 16 | 17 | 18 | 19 | 20 | 21 | 22 | 23 |
|----|----|----|----|----|----|----|----|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 26 | 27 |
| 20 | 21 | 22 | 23 | 25 | 26 | 27 | 28 |
| 21 | 22 | 23 | 24 | 26 | 27 | 28 | 30 |
| 22 | 23 | 24 | 26 | 27 | 28 | 30 | 31 |
| 23 | 24 | 25 | 27 | 28 | 30 | 31 | 33 |

After quantization module 28 generates a matrix of quantized coefficients, entropy encoding module 30 may compress the matrix of quantized coefficients using an entropy encoding scheme. To compress the matrix of quantized coefficients using an entropy encoding scheme, entropy encoding module 30 may organize the quantized coefficients into a vector by taking a zigzag pattern of the coefficients. In other words, entropy encoding module 30 may arrange all of the quantized coefficients in the two dimensional matrix of quantized coefficients into a one-dimensional vector of quantized coefficients in a predictable. Entropy encoding module 30 may then apply an entropy encoding scheme, such as Huffman coding or arithmetic coding, to the vector of quantized coefficients.

Encoding module 8 also includes one or more modules to perform temporal encoding of video frames. As illustrated in the example of FIG. 2, encoding module 8 includes a motion estimation module 32, a reconstructed frame generation module 34, and a residual frame generation module 36. Motion estimation module 32 attempts to identify a source macroblock in a reference image for each macroblock in a current video frame. Motion estimation module 32 may attempt to identify a source macroblock for a macroblock in the current frame be searching for macroblocks in the reference image that contain similar pixels as the macroblock. Motion estimation module 32 may search areas of different sizes in accordance with different coding standards in order to a identify source macroblock for a macroblock in the current frame. For instance, motion estimation module 32 may search for a source macroblock within an area that is pixels 32 pixels wide by 32 pixels high, with the current macroblock at the center of the search area. When motion estimation module 32 identifies a source macroblock for a macroblock in the current frame, motion estimation module 32 calculates a motion vector for the macroblock in the current frame. The motion vector for the macroblock in the current frame specifies an x value that indicates the difference in horizontal position between the identified source macroblock and the macroblock of the current frame. After motion estimation module 32 has either calculated a motion vector or has been unable to identify a source macroblock for each macroblock in the current frame, motion estimation module 32 may provide the calculated motion vectors for the current frame to reconstructed frame generation module 34.

Reconstructed frame generation module 34 may use the motion vectors and the reference frames to generate a reconstructed frame. Reconstructed frame generation module 34 may generate the reconstructed frame by applying the motion vectors for each macroblock in the current frame to the source macroblocks in the reference frames. In effect, reconstructed frame generation module 34 creates a frame in which the macroblocks of the reference frames have been "moved" to the positions indicated by the corresponding motion vectors of the current frame.

Residual frame generation module 36 may generate the residual frame by subtracting pixel component values in the reconstructed frame from corresponding pixel component values in the current frame. In general, the residual frame includes less information than either the reconstructed frame or the current frame. After residual frame generation module 36 generates the residual frame, residual frame generation module 36 provides the residual frame to block splitter module 22 in order to begin the process of spatially encoding the residual frame. Furthermore, motion estimation module 32 may provide the motion vectors for the current frame to entropy encoding module 30 in order to compress the motion vectors. After the residual frame is spatially encoded and entropy encoding module 30 has encoded the motion vectors, stream output module 38 may format the spatially encoded residual frame and the encoded motion vectors as part of a video bitstream.

Figure 3:
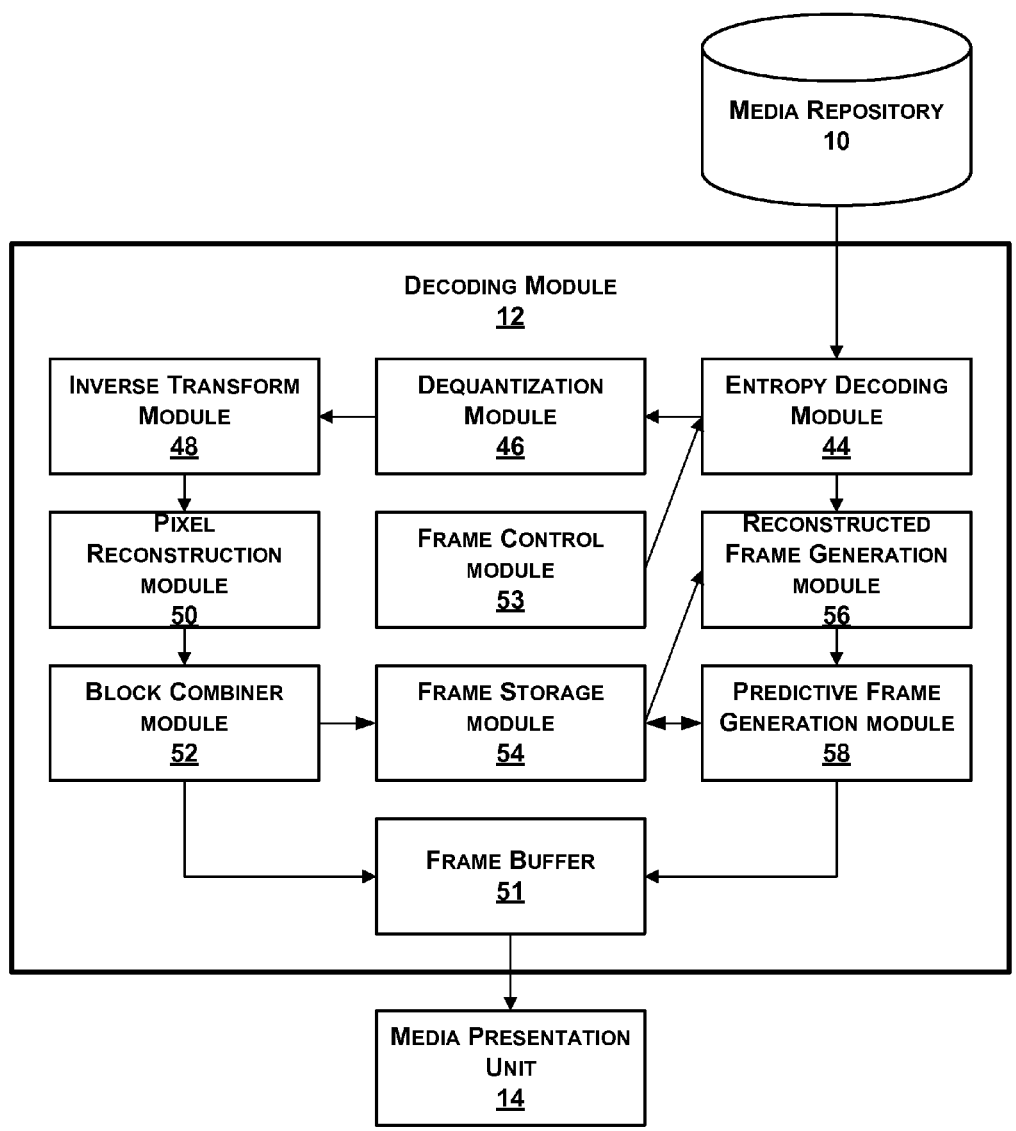
FIG. 3 is a block diagram illustrating exemplary details of a decoding module.

FIG. 3 is a block diagram illustrating exemplary details of decoding module 12. Decoding module 12 may comprise an entropy decoding module 44, a dequantization module 46, an inverse transform module 48, a pixel reconstruction module 50, a frame buffer 51, block combiner module 52, a frame control module 53, a reference frame storage module 54, a reconstructed frame generation module 56, and a predictive frame generation module 58. Some or all of these modules may comprise subsets of the software instructions of decoding module 12. Alternatively, some or all of these modules may comprise special-purpose hardware or firmware. In another alternative, these modules may comprise software instructions and special-purpose hardware or firmware.

When decoding module 12 receives a bitstream containing a video frame, entropy decoding module 44 may apply an entropy decoding scheme to the matrixes of quantized coefficients in the video frame. The bitstream may include a value that indicates to entropy decoding module 44 which entropy decoding scheme to apply the matrixes of quantized coefficients in the bitstream. In addition, entropy decoding module 44 may apply the same or a different entropy decoding scheme to decode the motion vectors of the video frame.

After entropy decoding module 44 applies the entropy decoding scheme to the matrixes of quantized coefficients in the video file, a dequantization module 46 may dequantize the coefficients in each of the matrixes of quantized coefficients. Depending on the coding standard, dequantization module 46 may dequantize the coefficients in a variety of ways. For example, in accordance with the MPEG-4 part 2 standard, dequantization module 46 may use the two quantization matrixes listed above in two different ways. First, dequantization module 46 may use these quantization matrixes to perform H.263-style de-quantization. In H.263-style de-quantization, dequantization module 46 obtains reconstructed coefficients F″[v][u] from quantized values QF[v][u] as follows:

When inverse transform module 48 receives a matrix of de-quantized coefficients, inverse transform module 48 generates a matrix of pixel components, As described in detail below, inverse transform module 48 generates the matrix of pixel component values by first scaling each coefficients in the matrix of de-quantized coefficient, adding a bias value to the DC coefficient of the matrix, applying a series of one-dimensional discrete cosine transforms, right-shifting the resulting values, clipping the right-shifted values, and then outputting the clipped values.

After inverse transform module 48 outputs a matrix of pixel component values, pixel reconstruction module 50 may generate a matrix of pixels by combining the matrix of pixel component values with matrixes of pixel component values associated with equivalent positions within a video frame. For example, pixel reconstruction module 50 may receive a matrix of Y pixel component values, a matrix of Cb pixel component values, and a matrix of Cr pixel component values from inverse transform module 48. Each of these three matrixes may include pixel components for a single 8×8 block of pixels. Each of the pixels may include a Y pixel component value, a Cb pixel component value, and a Cr pixel component value. After generating the matrix of pixels, pixel reconstruction module 50 may provide the block of pixels to block combiner module 52.

When block combiner module 52 receives a block of pixels, block combiner module 52 may buffer the block of pixels until block combiner module 52 receives some or all of the blocks of pixels in a video frame. After receiving one or more of the blocks of pixels, block combiner module 52 may combine the blocks of pixels into a video frame and may output the video frame to frame buffer 51. The video frame may be stored in frame buffer 51 until it is displayed by media presentation unit 51. In addition, block combiner module 52 may output the video frame to a frame storage module 54. Video frames in frame storage module 54 may be used as reference frames for the reconstruction of predictive and bi-predictive frames. In addition, video frames in frame storage module 54 may be residual frames that are used in the reconstruction of predictive and bi-predictive frames.

$$|F''[v][u]| = \begin{cases} 0, & \text{if } QF[v][u] = 0, \\ (2 \times |QF[v][u]| + 1) \times \text{quantiser\_scale}, & \text{if } QF[v][u] \neq 0, \quad \text{quantiser\_scale is odd}, \\ (2 \times |QF[v][u]| + 1) \times \text{quantiser\_scale} - 1, & \text{if } QF[v][u] \neq 0, \quad \text{quantiser\_scale is even}. \end{cases}$$

$$F''[v][u]: F''[v][u] = \text{Sign}(QF[v][u]) \times |F''[v][u]|,$$

which involves only one multiplication by quantiser_scale, and

Second, dequantization module 46 may use these quantization matrixes to perform MPEG-1/2-style de-quantization. In MPEG-1/2 style de-quantization, dequantization module 46 uses additional weighting matrices W[w][v][u] where w indicates which weighting matrix is being used:

In order to reconstruct a predictive or a bi-predictive frame, decoding module 12 includes reconstructed frame generation module 56. Reconstructed frame generation module 56 receives the decoded motion vectors from entropy decoding module 44. In addition, reconstructed frame generation module 56 retrieves the reference frames of the current frame from frame storage module 54. Reconstructed frame generation $$F''[v][u] = \begin{cases} 0, & \text{if } QF[v][u] = 0 \\ ((2 \times QF[v][u] + k) \times W[w][v][u] \times \text{quantiser\_scale})/16, & \text{if } QF[v][u] \neq 0 \end{cases}$$

where:

$$k = \begin{cases} 0 & \text{intra blocks} \\ \text{Sign}(QF[v][u]) & \text{non-intra blocks} \end{cases}$$

module 56 then "moves" macroblocks from their positions in the reference frames into positions indicated by the motion vectors. A reconstructed frame results from moving the macroblocks in this manner. After reconstructed frame generation module 56 generates the reconstructed frame, reconstructed frame generation module 56 provides the reconstructed frame to predictive frame generation module 58.

When predictive frame generation module 58 receives a temporary frame, predictive frame generation module 58 may retrieve from frame storage module 54 a residual frame for the current frame. After retrieving the residual frame, predictive frame generation module 58 may add corresponding color component values in each pixel of the residual frame and the reconstructed frame. A reconstructed video frame results from this addition. Next, predictive frame generation module 58 may output this reconstructed frame to frame buffer 51 for eventual display on media presentation unit 14.

Figure 4:
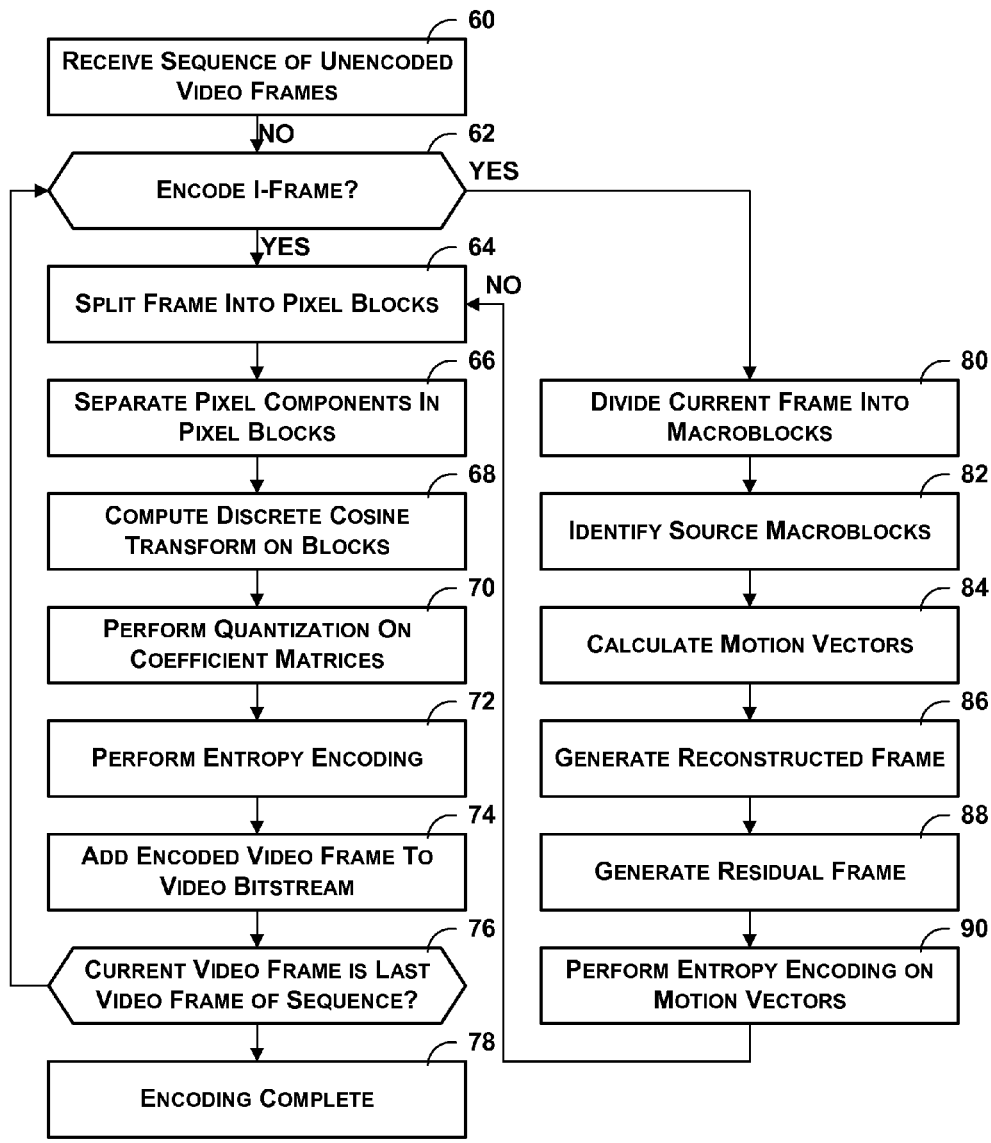
FIG. 4 is a flowchart illustrating an exemplary operation of the encoding module.

FIG. 4 is a flowchart illustrating an example operation of encoding module 8. Although the operation described in FIG. 4 is described in sequential fashion, it should be noted that the operation may be performed in a pipelined fashion.

Initially, encoding module 8 receives a sequence of unencoded video frames (60). For example, encoding module 8 may receive a sequence of unencoded frames in the form of sets of pixels from media source 4. When encoding module 8 receives the sequence of unencoded frames, frame control module 20 in encoding module 8 may determine whether a current frame in the sequence of unencoded frames is to be encoded as an i-frame or as a predictive or bi-predictive frame (62).

If frame control module 20 determines that the current frame is to be encoded as an i-frame, block splitter module 22 in encoding module 8 may split the current frame into blocks of pixels (64). For example, encoding module 8 may split the current frame into 2×2, 4×4, or 8×8 blocks of pixels.

After splitting the current frame into blocks of pixels, component extraction module 24 may separate the pixel component values in each of the blocks of pixels (66). As a result, there may be three blocks of pixel component values for each block of pixels: a block of Y values to represent the brightness of pixels, a block of Cb values to represent the blue chrominance of pixels, and a block of Cr values to represent the red chrominance of pixels.

Forward transform module 26 in encoding module 8 may then generate a matrix of scaled coefficients for each of the matrixes of pixel component values (68). Coefficients in these matrixes of scaled coefficients are approximations of values that would be produced by using an ideal two-dimensional forward discrete cosine transform on respective ones of the matrixes of pixel component values.

After forward transform module 26 generates the matrixes of scaled coefficients for each of the matrixes of pixel components, quantization module 28 in encoding module 8 may quantize the coefficients in each of the matrixes of scaled coefficients (70). Once quantization module 28 has quantized the coefficients in each matrix of scaled coefficients, entropy encoding module 30 may perform an entropy encoding process on each of the matrixes of quantized coefficients (72). For example, encoding module 8 may apply a Huffman encoding scheme or an arithmetic encoding scheme to each matrix of the quantized coefficients. The entropy encoding process further compressed the data. However, entropy encoding processes do not result in the loss of information. After performing the entropy encoding process on each matrix of quantized coefficients, stream output module 38 in encoding module 8 may add the encoded matrixes of quantized coefficients to a bitstream for the sequence of video frames (74). After stream output module 38 adds the encoded matrixes to the bitstream, frame control module 20 may determine whether the current frame was the last video frame of the sequence of frames (76). If the current frame is the last frame of the sequence of frames ("YES" of 76), encoding module 8 has completed the encoding of the sequence of frames (78). On the other hand, if the current frame is not the last frame of the sequence of frames ("NO" of 76), encoding module 8 may loop back and determine whether a new current frame is to be encoded as an i-frame (62).

If the current frame is not to be encoded as an i-frame ("NO" of 62), motion estimation module 32 in encoding module 8 may divide the current frame into a set of macroblocks (80). Next, motion estimation module 32 may attempt to identify a source macroblock in one or more reference frames for each of the macroblocks in the current frame (82). Motion estimation module 32 may then calculate a motion vector for each of the macroblocks in the current frame for which motion estimation module 32 was able to identify a source macroblock (84). After motion estimation module 32 calculates the motion vectors, reconstructed frame generation module 34 uses the motion vectors to generate a reconstructed frame by "moving" the identified macroblocks in the reference frames into positions indicated by the motion vectors (86). Residual frame generation module 36 may then generate a residual frame for the current frame by subtracting the pixel component values in the reconstructed frame from corresponding pixel component values in the current frame (88). After residual frame generation module 36 generates the residual frame, entropy encoding module 30 may use an entropy encoding scheme to encode the motion vectors for the current frame (90). In addition, spatial encoding may be applied to the residual frame by applying steps (66) through (74) to the residual frame.

Figure 5:
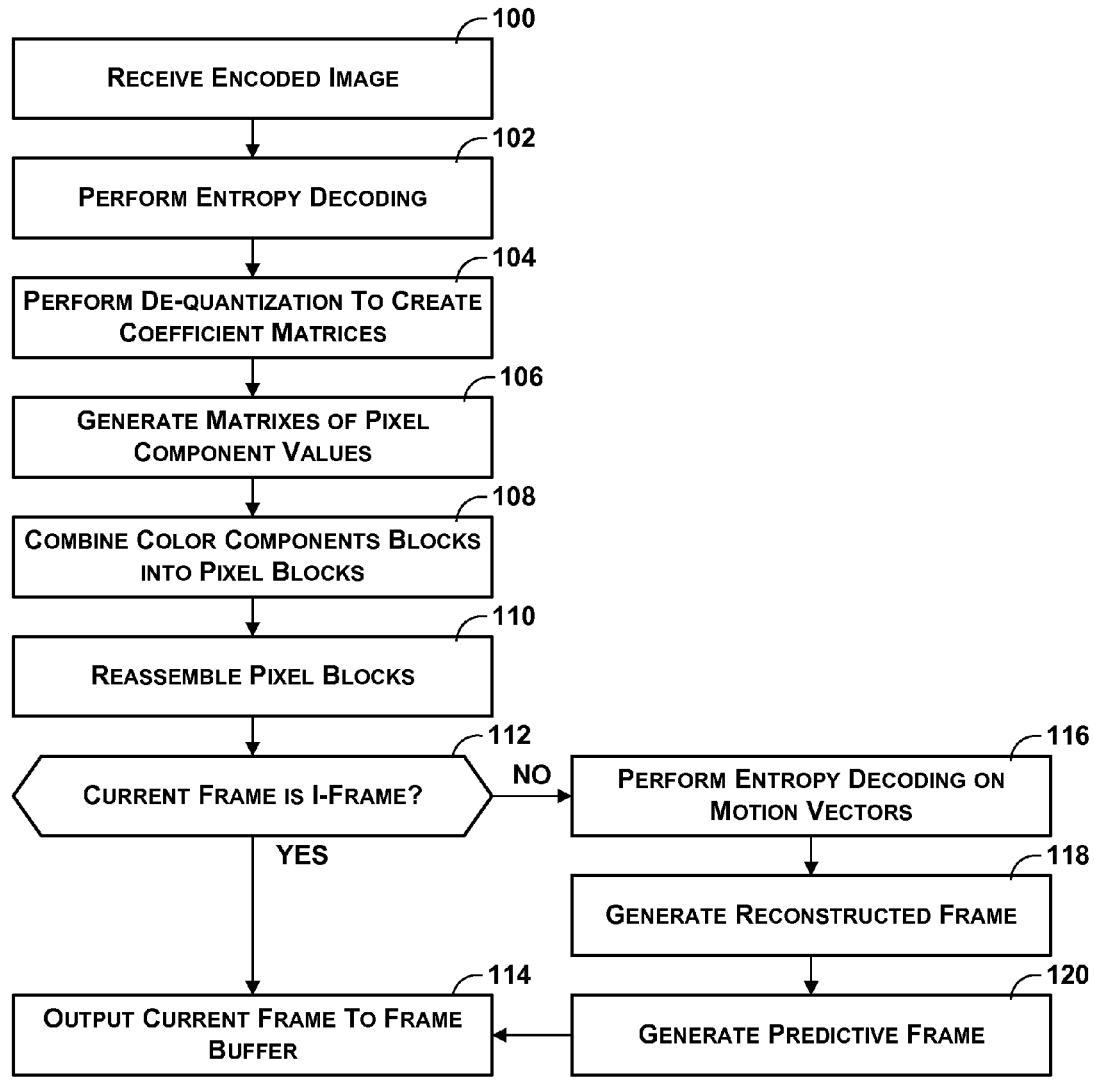
FIG. 5 is a flowchart illustrating an exemplary operation of the decoding module.

FIG. 5 is a flowchart illustrating an exemplary operation of decoding module 12. Although the operation described in FIG. 5 is described in sequential fashion, it should be noted that the operation may be performed in a pipelined fashion.

Initially, decoding module 12 receives an encoded video frame (100). After receiving the encoded video frame, entropy decoding module 44 in decoding module 12 may perform an entropy decoding process on blocks of data within the encoded frame (102). Entropy decoding module 44 may perform an entropy decoding process that is equivalent to the entropy encoding process used to encode the frame. For example, if encoding module 8 uses Huffman encoding to encode the frame, entropy decoding module 44 uses Huffman decoding to decode the frame. As a result of applying the entropy decoding process to each block of data in the frame, entropy decoding module 44 has produced a set of matrixes of quantized coefficients.

Next, dequantization module 46 in decoding module 12 may dequantize the coefficients in each of the matrixes of quantized coefficients (104). After dequantizing each coefficient in the matrixes of quantized coefficients, inverse transform module 48 in decoding module 12 generates matrixes of pixel component values (106). Pixel component values in one of the matrix of pixel component values are approximations of corresponding values that would be produced by transforming one of the matrixes of quantized coefficients using an ideal two-dimensional inverse discrete cosine transform.

When inverse transform module 48 has computed a matrix of pixel component values for each of the matrixes of coefficients, pixel reconstruction module 50 in decoding module 12 may combine appropriate matrixes of pixel component values in order to create blocks of pixels (108). For example, decoding module 12 may combine a block of Y values with an associated block of Cr values and an associated block of Cb values in order to create a block of YCrCb pixels. After pixel reconstruction module 50 has created the blocks of pixels, block combiner module 52 may recombine the blocks of pixels into a video frame (110).

Next, frame control module 53 in decoding module 12 may determine whether the current frame is a i-frame (114). If the current frame is an i-frame ("YES" of 114), block combiner module 52 may output the video frame to frame buffer 51 (114). On the other hand, if the current frame is not an i-frame (i.e., the current frame is a predictive or bi-predictive frame) ("NO" of 114), entropy decoding module 44 uses an entropy decoding scheme to decode the motion vectors of the current frame (116). Next, reconstructed frame generation module 56 uses the decoded motion vectors and one or more reference frames in frame storage module 54 to generate a reconstructed frame (118). Predictive frame generation module 58 may then use the reconstructed frame and the frame generated by block combiner module 52 to generate a reconstructed frame (120).

Figure 6:
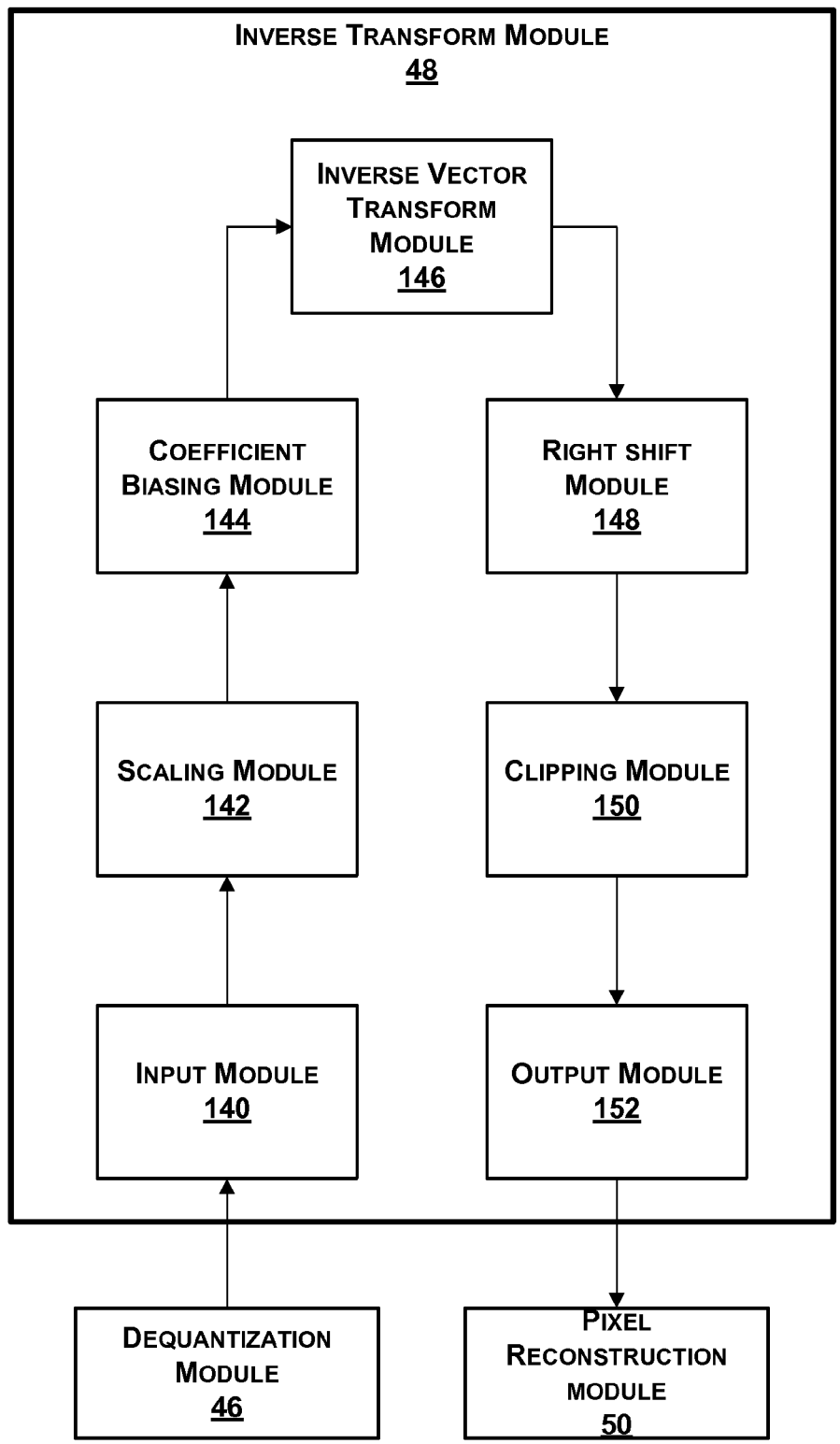
FIG. 6 is a block diagram illustrating exemplary details of an inverse discrete cosine transform ("IDCT") module.

FIG. 6 is a block diagram illustrating exemplary details of inverse transform module 48. As illustrated in the example of FIG. 6, inverse transform module 48 may comprise an input module 140. Input module 140 may receive a matrix of coefficients from dequantization module 46. For example, input module 140 may receive a pointer that indicates a location in a memory module of device 2 that stores the matrix of coefficients. Alternatively, input module 140 may include internal data structures that store the matrix of coefficients.

When input module 140 receives a matrix of de-quantized coefficients, input module 140 may provide the matrix of coefficients to a scaling module 142 in inverse transform module 48. Scaling module 142 generates a matrix of scaled coefficients by scaling each coefficient in the matrix of de-quantized coefficients. Scaling module 142 may scale the coefficients in the matrix of de-quantized coefficients by left-shifting each coefficient by a number of mantissa bits used be a inverse transform module 146 to represent fixed-point representations of numbers. Mantissa bits are those bits that are to the left side of the radix point (i.e., the fractional portion of the number). In this way scaling module 142 effectively converts the representations of the coefficients in the matrix of de-quantized coefficients into fixed-point representations with the appropriate number of mantissa bits. For example, if inverse transform module 146 uses fixed-point numbers that include three mantissa bits, scaling module 142 generates the matrix of scaled coefficients by left-shifting each of the coefficients in the matrix of de-quantized coefficients by three positions.

After scaling module 142 generates the matrix of scaled coefficients, coefficient biasing module 144 may generate a matrix of biased coefficients by adding a midpoint bias value and a supplemental bias value to the DC coefficient of the matrix of scaled coefficients. As discussed above, the DC coefficient of the matrix is typically the coefficient at the top left position of the matrix. In general, the DC coefficient represents a mean value of the other coefficients in the matrix.

The supplemental bias value is a value that causes positive errors and negative errors to be, on average, equal in magnitude and to be, on average, symmetric about zero. For example, the supplemental bias value may a sign-adaptive bias value that is equal to zero when the DC coefficient is non-negative and equal to negative one when the DC coefficient is negative. In order to add a sign-adaptive bias value to the DC coefficient in a 16-bit processor, coefficient biasing module 144 may use the following formula:

$$\text{DC\_coefficient} = \text{DC\_coefficient} + (1 \ll (P+2)) + (\text{DC\_coefficient} \gg 15). \quad (1)$$

In formula (1), the term $(1 \ll (P+2))$ is added to provide midpoint bias. P is a constant referring to the number of fixed-point mantissa bits (i.e., bits to the right of the radix point) used in the transform performed by inverse vector transform module 146. The number 2 is added to P because right-shift module 148 may right-shift all coefficients by (P+3), where the number '3' comes from the bits of precision added by performing the inverse discrete cosine transform. To elaborate this point, if a number x is generated by left-shifting 1 by (P+2) and a number z is generated by right-shifting x by (P+3), then z=½. (Otherwise stated, $2^{P+2}/2^{P+3} = 2^0/2^1 = \frac{1}{2}$). Thus, adding $(1 \ll (P+2))$ to the DC coefficient is equivalent to adding $(1 \ll (P+3))/2$ to the DC coefficient.

In formula (1), the term (DC_coefficient>>15) right shifts the 16-bit DC coefficient by 15 positions. The remaining one bit indicates the sign of the DC coefficient. For example, suppose that the DC coefficient was 0b1111 1100 0011 0101. In this example, with sign extension, shifting the DC coefficient right by 15 positions results in the value of 0b1111 1111 1111 1111 (decimal, −1). Similarly, if the DC coefficient was 0b0111 1111 1111 1111, shifting the DC coefficient right by 15 positions results in the value of 0b0000 0000 0000 0000 (decimal, 0).

In another example, the supplemental bias value may be a dithering bias value. The dithering bias value is a value that is equal to −1 or 0. In order to add a sign-dithering bias value to the DC coefficient in a 16-bit processor, IDCT module 34 may use the following formula:

$$\text{DC\_coefficient} = \text{DC\_coefficient} + (1 \ll (P+2)) + \text{dither}(-1|0). \quad (2)$$

In formula (2), P indicates the number of mantissa bits in DC_coefficient. The term $(1 \ll (P+2))$ adds midpoint bias. The term dither(−1|0) indicates IDCT module 34 selects −1 or 0 on a pseudo-random basis.

Coefficient biasing module 144 may also add the midpoint bias value and the supplemental bias value to each of the AC coefficients in the matrix of scaled coefficients. The AC coefficients of a matrix are all coefficients in the matrix other than the DC coefficient. Adding the midpoint bias value and the scaled bias value to each of the AC coefficients may further reduce rounding errors.

Figure 10:
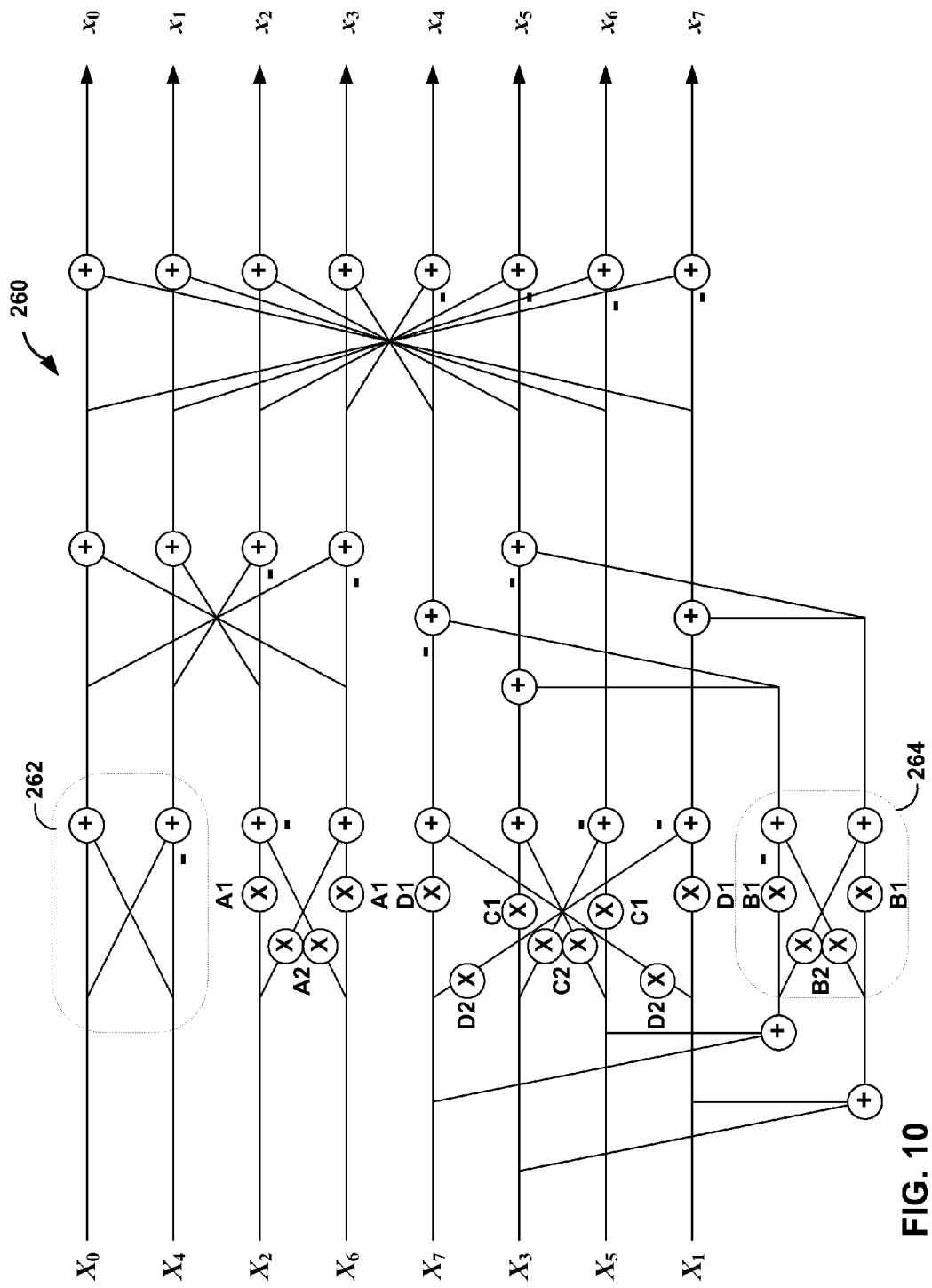
FIG. 10 is a flow diagram illustrating a first exemplary one-dimensional transform.
Figure 11:
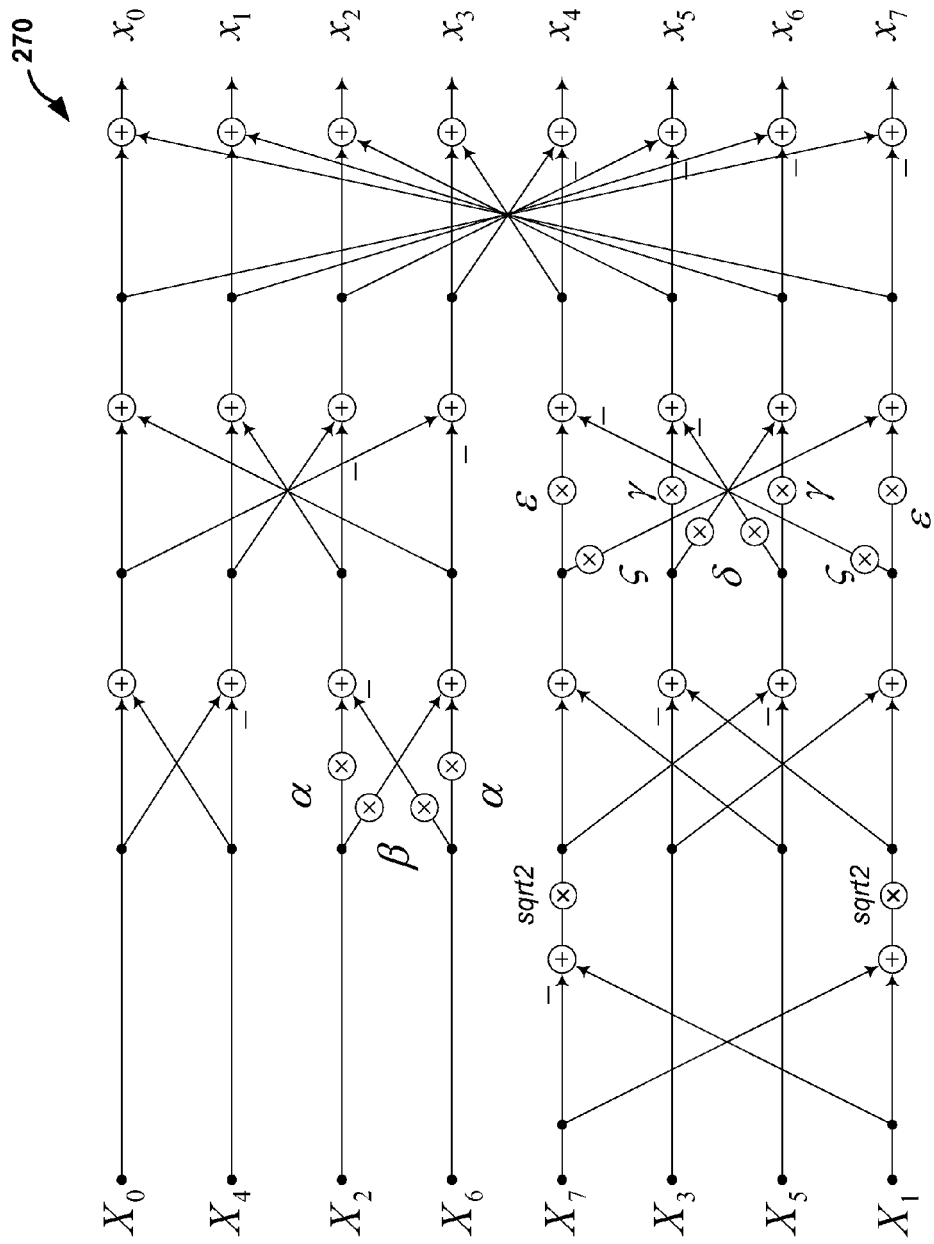
FIG. 11 is a flow diagram illustrating a second exemplary one-dimensional transform.

After coefficient biasing module 144 generates the matrix of biased coefficients, inverse vector transform module 146 generates a matrix of transformed coefficients by using fixed-point arithmetic to repeatedly apply a one-dimensional transform to the matrix of biased coefficients. For example, inverse vector transform module 146 may generate a matrix of intermediate values by using fixed-point arithmetic to apply a one-dimensional transform to each row vector of coefficients in the matrix of biased coefficients. Next, inverse vector transform module 146 may compute the matrix of transformed coefficients by using fixed-point arithmetic to apply the one-dimensional transform to each column vector in the matrix of intermediate values. Exemplary one-dimensional transforms are illustrated in FIGS. 10 and 11 below.

After inverse vector transform module 146 generates the matrix of transformed coefficients, right-shift module 148 may generate a matrix of adjusted coefficients by right-shifting each of the coefficients in the matrix of transformed coefficients by a number of positions equal to the number of bits added during the application of the transform and during scaling. For example, if applying the transform results in an additional three bits and scaling the coefficients adds an additional three bits, right-shift module 148 may right-shift each of the coefficients by six (3+3) positions.

Right-shift module 148 may perform this right-shift as a substitute for dividing each of the coefficients by $2^b$, where b is equal to the number of additional bits added by inverse vector transform module 146 plus the number of bits added to the mantissa portion of coefficients by scaling module 142 during scaling. Differences between source image data and result image data may occur due to the difference between $x_n 2^b$ and $x_n \gg b$, where $x_n$ is a coefficient in the matrix at position n. Some of these differences may occur due to rounding errors attributable to the fact in the limited precision of fixed-point arithmetic, $(x_n \gg b)$ does not equal $(x_n/2^b)$ for all values of $x_n$. For example, encoding module 8 may use sixteen bit fixed-point numbers and $x_n$=63 (0000 0000 0011 1111 in binary) and b=6. In this example, shifting 0000 0000 0011 1111 to the right by six positions results in the binary value of 0000 0000 0000 0000. Hence, 63>>6=0. Meanwhile, $63/2^6$=31/64=0.984375. The difference between 0 and 0.984 may result in a visible difference between the source image and the result image.

Adding bias values to DC coefficient reduces the differences due to rounding errors. For example, coefficient biasing module 144 may add a midpoint bias value c to $x_n$. Midpoint bias value c may equal $2^b/2=2^{(b-1)}$. For example, if b=6, then $c=2^6/2=64/2=32$. In this example, if $x_n$=63, then 63+32=95 (0b0000 0000 0101 1111). 95 right-shifted by 6 positions=1 (0b0000 0000 0000 0001 in binary). The value 1 produced after adding the midpoint bias value is closer to the correct value of 0.984375 than the value 0 produced without adding the midpoint bias value.

In addition to adding midpoint bias value c, coefficient biasing module 144 may also add a supplemental bias value to the DC coefficient. For example, coefficient biasing module 144 may add a sign-adaptive bias value $d(x_n)$. Sign-adaptive bias value $d(x_n)$ may equal −1 when $x_n$ is negative and may equal 0 otherwise. Adding sign-adaptive bias value $d(x_n)$ may result in values that are better approximations than values without sign-adaptive bias value $d(x_n)$. For instance, without sign-adaptive bias value $d(x_n)$, the function $(x_n+c) \gg b$ is not symmetrical about 0. For example, if $x_n$=32, b=6, and c=32, then $(x_n+c) \gg b$=1. However, if $x_n$=−32, b=6, and c=32, then $(x_n+c) \gg b$=0. This lack of symmetry about zero may result in progressively greater errors when calculating successive predictive video frames. Furthermore, differences between $x_n \gg b$ and $x_n/2^b$ are greater when $x_n$ is greater than zero than when $x_n$ is less than zero. This may also produce errors.

Sign-adaptive bias value $d(x_n)$ may correct these problems. For example, suppose that $x_n$=32, b=6, c=32, then $d(x_n)$=0. Hence, $(x_n+c+d(x_n)) \gg b$=1. Now suppose that $x_n$=−32, b=6, c=32, then $d(x_n)$=−1. Hence, $(x_n+c+d(x_n)) \gg b$=−1. This example illustrates that the function $(x_n+c+d(x_n)) \gg b$ is now symmetric about 0 and does not produce differences that are greater when $x_n$ is greater than zero than when $(x_n)$ is less than zero.

In an alternative implementation, coefficient biasing module 144 may add a dithering bias value e instead of adding sign-adaptive bias value d. When coefficient biasing module 144 adds dithering bias value e to the DC coefficient, coefficient biasing module 144 may select either the value 0 or the value −1 to be the value of e on a pseudo-random basis. In order to select the value of dithering bias value e, coefficient biasing module 144 may include the following instructions:

```
#define IB1 1
#define IB2 2
#define IB5 16
#define IB18 131072
#define MASK (IB1+IB2+IB5)
static unsigned long iseed = 0xAAAAAAAA;
int ditherBit( ) {
    if (iseed & IB18) {
        iseed = ((iseed ^ MASK) << 1) | IB1;
        return 1;
    } else {
        iseed <<= 1;
        return 0;
    }
}
```

Many video encoding standards use what is known as a group of pictures ("GOP"). A GOP comprises an i-frame and a set of predictive frames and/or bi-predictive frames that reference the i-frame and/or other predictive or bi-predictive frames within the GOP. For instance, a media file may include an i-frame that is encoded using a set of coefficient matrixes. To produce a video sequence, decoding module 12 may produce predictive frames based on this i-frame. Errors caused by decoding the i-frame are reflected in a predictive frame based on the i-frame. In addition, errors caused by decoding the predictive frame are incorporated into a next predictive frame. If errors caused by decoding the frames are not symmetric about zero or tend to have greater positive or negative magnitude, these errors may quickly increase or decrease the values of pixel component values in successive predictive frames. For example, if errors tend to have greater positive error, these errors may add up in successive predictive frames, resulting in pixel component values being higher than the correct pixel component values. As a result, pixels in successive predictive frames within a GOP may improperly change color or brightness. This is known as drift error. To avoid drift error that is too severe, only a limited number of frames can be generated from an i-frame. Due to rounding, errors may be greater in magnitude when performing the transform using fixed-point numbers that have limited numbers of mantissa bits (e.g., three mantissa bits) than when performing the transform using numbers that have greater precision. Hence, drift error may be especially problematic when performing the transform using fixed-point numbers that have limited numbers of mantissa bits.

Selecting the value of dithering bias value e on a pseudo-random basis means that each predictive frame has an equally likely chance of having errors that have greater positive magnitude or errors that have greater negative magnitude. Thus, within a group of pictures, positive errors and negative errors tend to be equal in magnitude and tend to be symmetric about zero. Because positive errors and negative errors are, on average, symmetric about zero and positive errors and negative errors are, on average, equal in magnitude, the errors are not likely to be propagated and exaggerated in subsequent predictive frames. This is because errors with positive magnitude are likely to cancel out errors with negative magnitude in another frame, and vice versa. Hence, because the dithering bias value tends to make errors symmetric about zero and tends to make positive errors and negative errors equal in magnitude, there is likely to be less drift error throughout a GOP. For this reason, more pictures can be included in a GOP. Because more pictures can be included in a GOP, the overall video sequence may have a better compression rate. Likewise, adding the sign-adaptive bias value results in errors within each frame that tend to be equal in magnitude and that tend to be symmetric about zero. As a result, these errors are not propagated and exaggerated in subsequent predictive frames.

After right-shift module 148 right-shifts the coefficients, a clipping module 150 may "clip" the coefficients in order to restrict the coefficients to a maximum allowable range of pixel component values. For example, in a typical JPEG image a color component value may range from −256 to 255. If the matrix of coefficients were to include a coefficient equal to 270, clipping module 150 would restrict this coefficient to the maximum allowable range by reducing the coefficient to 255. After clipping module 150 finishes clipping the coefficients, these coefficients may represent pixel component values. When clipping module 150 finishes clipping the coefficients in the matrix, clipping module 150 may provide the matrix of clipped coefficients to an output module 152.

When output module 152 receives a matrix of coefficients (which are now pixel component values), output module 152 may output the matrix of pixel component values to pixel reconstruction module 50.

Figure 7:
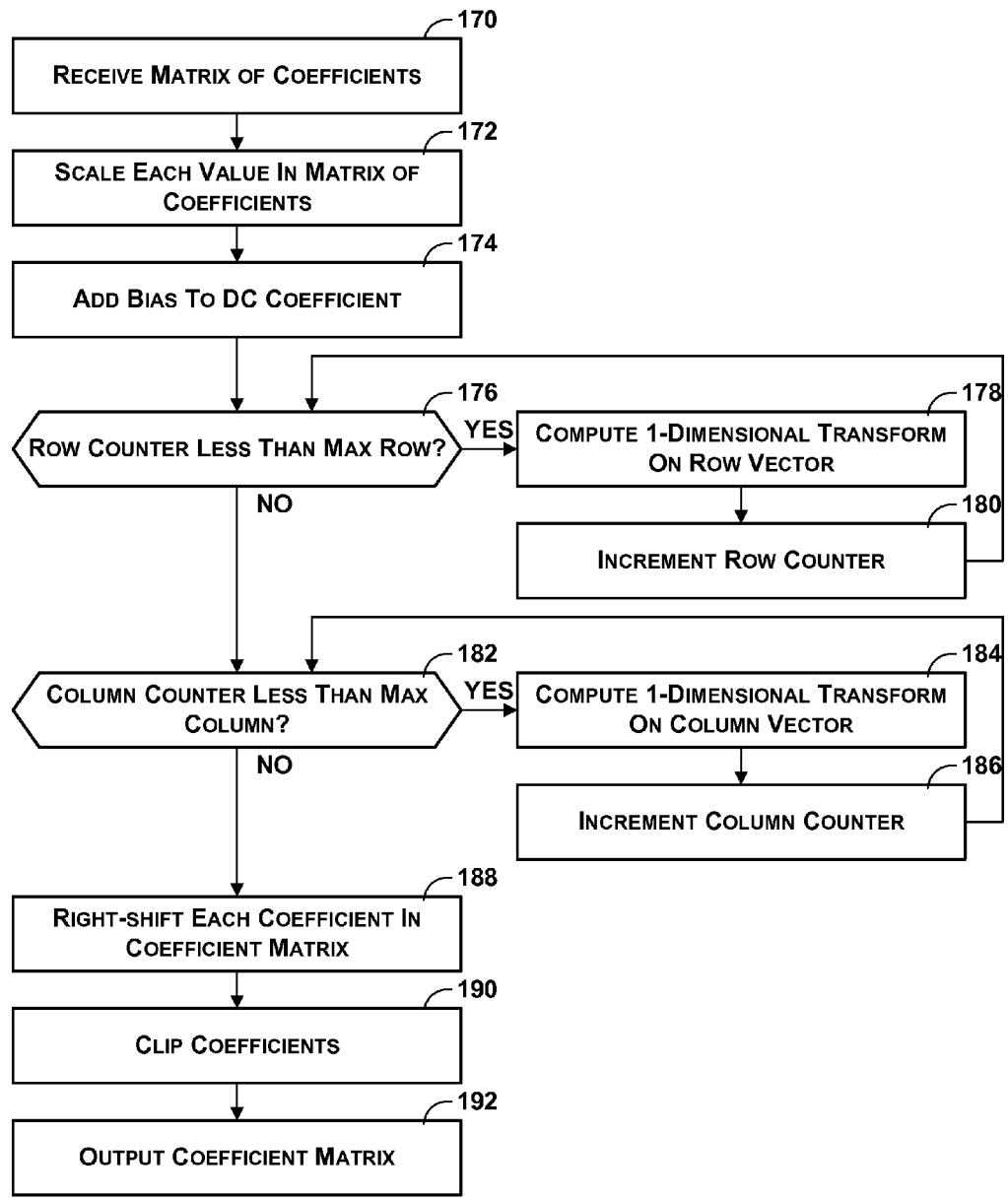
FIG. 7 is a flowchart illustrating an exemplary operation of the IDCT module.

FIG. 7 is a flowchart illustrating an exemplary operation of inverse transform module 34. Initially, input module 140 receives a matrix of de-quantized coefficients (170). When input module 140 receives the matrix of de-quantized coefficients, scaling module 142 may scale each value in the matrix of de-quantized coefficients, thereby generating a matrix of scaled coefficients (172). For example, scaling module 142 may perform operations that multiply each coefficient in the matrix of de-quantized coefficients by equivalently positioned values in a matrix of scale factors.

After scaling module 142 generates the matrix of scaled coefficients, coefficient biasing module 144 may add a midpoint bias value and a supplemental bias value to the DC coefficient of the matrix of scaled coefficients, thereby generating a matrix of biased coefficients (174). After coefficient biasing module 144 adds the bias value to the DC coefficient of the matrix, inverse vector transform module 146 may determine whether a row counter is less than a maximum row counter (176). Initially, the row counter may be set to zero. The maximum row counter may be a static value that is equal to the number of rows in the matrix of coefficients. For example, if the matrix of coefficients includes eight rows, maximum row counter is equal to eight.

If the row counter is less than the maximum row counter ("YES" of 176), inverse vector transform module 146 may used fixed-point arithmetic to apply a one-dimensional transform on a row vector of the matrix of coefficients indicated by the row counter (178). When inverse vector transform module 146 applies the transform on a row vector of the matrix of coefficients, inverse vector transform module 146 may replace the original coefficients in the row vector of coefficients with a vector of intermediate coefficients. After inverse vector transform module 146 applies the transform on a row vector of the matrix of coefficients, inverse vector transform module 146 may increment the row counter (180). Inverse vector transform module 146 may then loop back and again determine whether the row counter is less than the maximum row counter (176).

If the row counter is not less than (i.e., is greater than or equal to) the maximum row counter ("NO" of 176), inverse vector transform module 146 may determine whether a column counter is less than a maximum column counter (182). Initially, the column counter may be set to zero. The maximum column counter may be a static value that is equal to the number of columns in the matrix of coefficients. For example, if the matrix of coefficients includes eight columns, the maximum column counter is equal to eight.

If the column counter is less than the maximum column counter ("YES" of 182), inverse vector transform module 146 may apply the one-dimensional transform on a column vector of the matrix of intermediate coefficients indicated by the column counter (184). When inverse transform module 34 applies the transform on a column vector of intermediate coefficients, inverse transform module 34 replaces the intermediate coefficients in the column vector with a vector of transformed coefficients.

After inverse vector transform module 146 applies the transform on a column vector of the matrix of coefficients, inverse vector transform module 146 may increment the column counter (1 86). Inverse vector transform module 146 may then loop back and again determine whether the column counter is less than the maximum column counter (1 82).

If the column counter is not less than (i.e., is greater than or equal to) the maximum column counter ("NO" of 182), right-shift module 148 may right-shift each of the transformed coefficients in the matrix (188). When right-shift module 148 right-shifts a coefficient, right-shift module 148 may shift the coefficient to the right by a certain number of positions. The result of right-shifting each of the second intermediate coefficients in the matrix is a matrix of adjusted values. After right-shift module 148 has right-shifted each of the transformed coefficients, clipping module 150 may clip the adjusted coefficients in order to ensure that the adjusted coefficients are within an appropriate range for pixel component values (190). For instance, clipping module 150 may clip the adjusted coefficients in order to ensure that the adjusted coefficients are within the range −256 to 255. When clipping module 150 finishes clipping the adjusted coefficients, output module 152 may output the resulting matrix of pixel component values (192).

Figure 8:
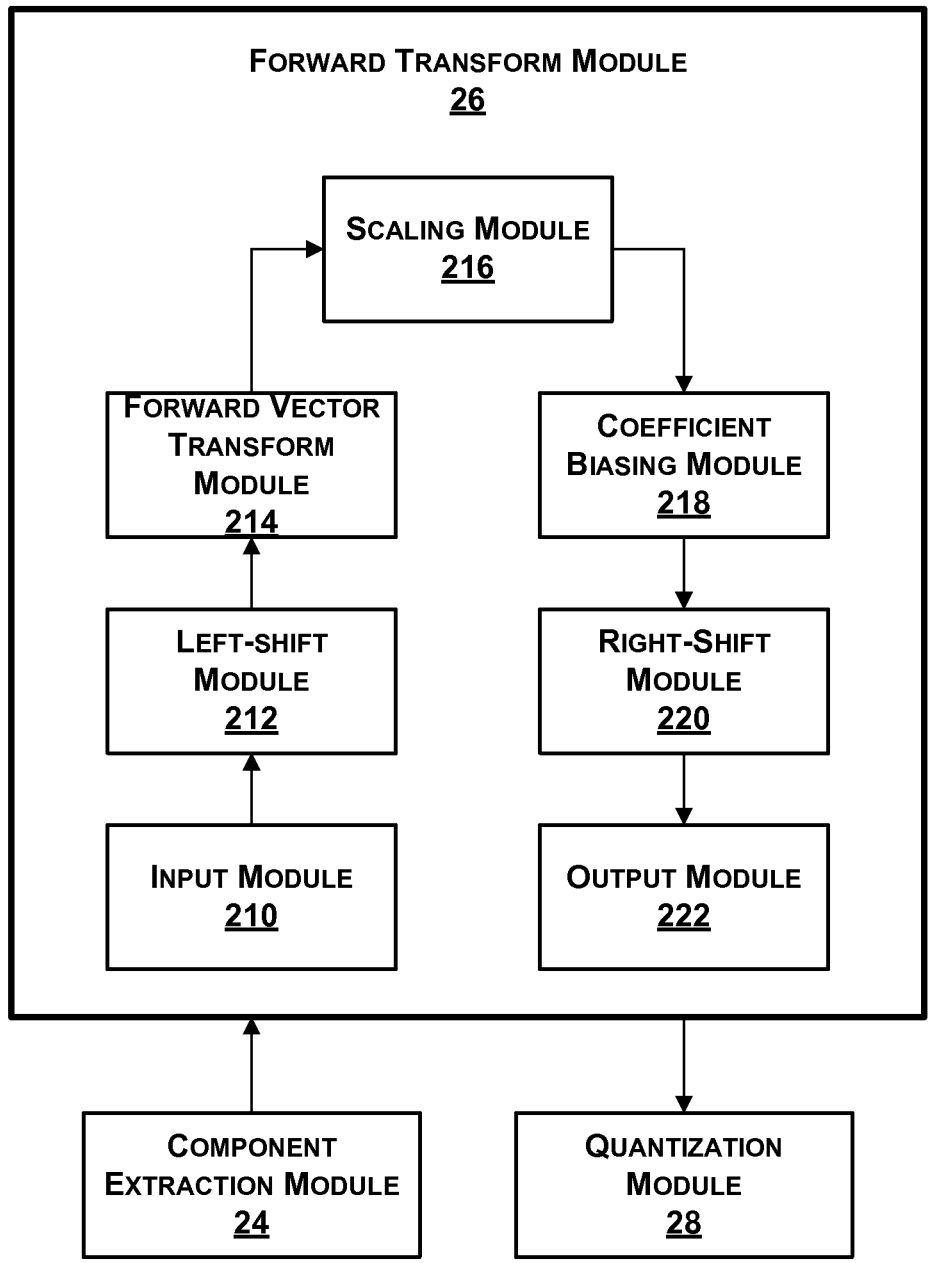
FIG. 8 is a block diagram illustrating exemplary details of a forward discrete cosine transform ("FDCT") module.

FIG. 8 is a block diagram illustrating exemplary details of forward transform module 26. As illustrated in the example of FIG. 8, forward transform module 26 comprises an input module 210 that receives a matrix of pixel component values from component extraction module 24. When input module 210 receives a matrix of pixel component values, input module 210 may provide the matrix of pixel component values to a left-shift module 212. Left-shift module 212 may shift all of the pixel component values in the matrix of pixel component values to the left by the number of mantissa bits used in values that a forward vector transform module 214 uses while performing the forward transform minus the number of mantissa bits removed by performing the forward transform. For example, if ten mantissa bits are used in values while performing the forward transform and three mantissa bits are removed by performing the forward discrete cosine transform, left-shift module 212 may shift the pixel component values to the left by seven positions. In another example, if three mantissa bits are used in values while performing the forward transform and three mantissa bits are removed by performing the forward transform, left-shift module 212 may shift the pixel component values to the left by zero positions.

After left-shift module 212 shifts the pixel component values, forward vector transform module 214 may apply a forward transform to each column vector in the matrix of pixel component values in order to produce a matrix of intermediate values. Next, forward vector transform module 214 may apply the forward transform to each row vector in the matrix of intermediate values in order to produce a matrix of transformed coefficients. When forward vector transform module 214 applies the forward transform to a vector, forward vector transform module 214 may apply the forward transform described in FIG. 12, below. Note that the transform described in FIG. 12, below is a reverse of the transform described in FIG. 11.

After forward vector transform module 214 produces the matrix of transformed coefficients, a scaling module 216 may apply scaling factors to each transformed coefficient in the matrix of transformed coefficients. Scaling module 216 may apply reciprocals of the scaling factors used by scaling module 142 in inverse transform module 48. For instance, if one or more values were factored out of the transform in order to improve the efficiency of the transform, these values may become the basis of a matrix of scale factors. Coefficients in the matrix of transformed coefficients may be corrected by multiplying coefficients by these values.

In order to decrease rounding errors, a coefficient biasing module 218 in forward transform module 26 may add a midpoint bias value and a supplemental bias value to coefficients in the matrix of scaled coefficients. Adding a sign-adaptive bias value or a dithering bias value to the coefficients in the matrix of transformed coefficients has a similar effect as when coefficient biasing module 144 in inverse transform module 48 adds a sign-adaptive bias value or a dithering bias value. That is, the addition of the bias values to the coefficient causes positive errors and negative errors to be, on average, equal in magnitude and to be, on average, symmetric about zero. These errors represent differences between values that result from right-shifting limited precision fixed-point representations of coefficients in the matrix of scaled coefficients by a first magnitude and results from dividing the coefficients in the matrix of scaled coefficients by 2 raised to the power of the first magnitude, without regard to precision.

After coefficient biasing module 218 generates the matrix of biased coefficients, a right-shift module 220 in forward transform module 26 may generate a matrix of output coefficients by right-shifting coefficients in the matrix of biased coefficients. Right-shift module 220 may right-shift each coefficient in the matrix of biased coefficients by the number of mantissa bits in the coefficients of the matrix of biased coefficients plus the number of bits added to the coefficients by performing the transform.

The following equation summarizes the effects of scaling module 216, coefficient biasing module 218, and right-shift module 220 on the matrix of transformed coefficients when coefficient biasing module 218 adds a sign-adaptive bias value:

$$F[v][u]=(F'[v][u]*S[v][u]+(1<<(P+Q)-((F'[v][u]>=0)?0:1)))>>(P+Q).$$

where v=0 . . . 7, u=0 . . . 7; where S[v][u] is an entry in the matrix of scale factors, F is the matrix of scaled coefficients, F' is the matrix of transformed coefficients, P indicates the number of mantissa bits in coefficients in the matrix of transformed coefficients, and Q indicates the number of bits added to coefficients in the matrix of transformed coefficients by applying the transform.

The following equation summarizes the effects of scaling module 216, coefficient biasing module 218, and right-shift module 220 on the matrix of transformed coefficients when coefficient biasing module 218 adds a dithering bias value:

$$F[v][u]=(F'[v][u]*S[v][u]+(1<<19)-(\text{dither}(0:1)))>>20$$

where v=0 . . . 7, u=0 . . . 7; where S[v][u] is an entry in the matrix of scale factors, F is the matrix of scaled coefficients, and F' is the matrix of transformed coefficients.

After scaling module 216 generates the matrix of scaled coefficients, an output module 222 may output the matrix of coefficients to quantization module 28.

Figure 9:
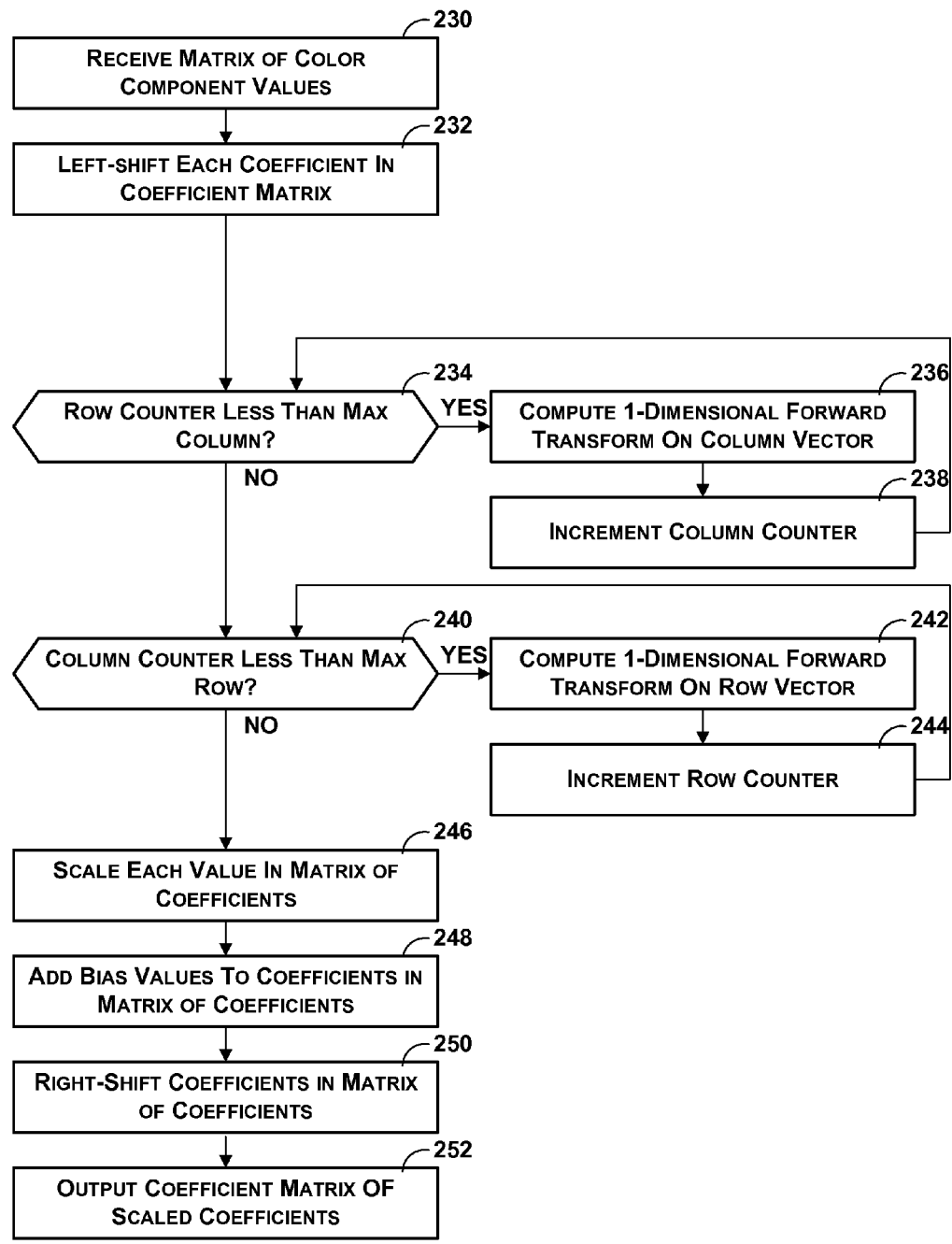
FIG. 9 is a flowchart illustrating an exemplary operation of the FDCT module.

FIG. 9 is a flowchart illustrating an exemplary operation of forward transform module 26. Initially, input module 210 receives a matrix of pixel component values (230). When input module 140 receives the matrix of pixel component values, left-shift module 212 may generate a matrix of adjusted coefficients by left-shifting each value in the matrix of pixel component values (232). For example, left-shift module 212 may shift all of the coefficients to the left by ten positions. In this example, left-shift module 212 may shift all of the coefficients to the right by ten positions because forward vector transform module 214 may use fixed point arithmetic in which numbers are encoded using ten bits in the fractional portion. Thus, by shifting the coefficients to the left by ten positions, left-shift module 212 effectively converts the pixel component values into fixed-point numbers with ten mantissa bits.

After left-shifting each pixel component value in the matrix of adjusted values, forward vector transform module 214 may determine whether a column counter is less than a maximum row counter (234). Initially, the column counter may be set to zero. The maximum column counter may be a static value that is equal to the number of columns in the matrix of adjusted coefficients. For example, if the matrix of adjusted coefficients includes eight columns, maximum column counter is equal to eight.

If the column counter is less than the maximum column counter ("YES" of 234), forward vector transform module 214 may compute a one-dimensional forward transform on a column vector indicated by the column counter (236). When forward vector transform module 214 computes the forward transform on a column vector of the matrix of adjusted coefficients, forward vector transform module 214 replaces the original adjusted coefficients in the column vector with intermediate coefficients. After forward vector transform module 214 computes the forward transform on a column vector of the matrix of adjusted coefficients, forward vector transform module 214 may increment the column counter (238). Forward vector transform module 214 may then loop back and again determine whether the column counter is less than the maximum column counter (234).

If the column counter is not less than (i.e., is greater than or equal to) the maximum column counter ("NO" of 234), forward vector transform module 214 may determine whether a row counter is less than a maximum row counter (240). Initially, the row counter may be set to zero. The maximum row counter may be a static value that is equal to the number of row vectors in the matrix of coefficients. For example, if the matrix of coefficients includes eight rows, the maximum row counter is equal to eight.

If the row counter is less than the maximum row counter ("YES" of 240), forward vector transform module 214 may compute a one-dimensional discrete cosine transform on a row vector indicated by the row counter (242). Because forward vector transform module 214 has already computed the forward transform on the row vectors of the matrix, the matrix of coefficients now contains intermediate coefficients. When forward vector transform module 214 computes the forward transform on a row vector of intermediate coefficients, forward vector transform module 214 replaces the intermediate coefficients in the column vector with transformed coefficients.

After forward vector transform module 214 computes the discrete cosine transform on a row vector of the matrix of coefficients, forward vector transform module 214 may increment the row counter (244). Forward vector transform module 214 may then loop back and again determine whether the row counter is less than the maximum row counter (240).

If the row counter is not less than (i.e., is greater than or equal to) the maximum row counter ("NO" of 240), scaling module 216 may scale each transformed coefficient in the matrix of transformed coefficients (246). After scaling module 216 generates the matrix of scaled coefficients, coefficient biasing module 218 may generate a matrix of biased coefficients by adding one or more bias values to coefficients in the matrix of scaled coefficients (248). For instance, coefficient biasing module 218 may add a midpoint bias value and a sign-adaptive or dithering supplemental bias value to each coefficient in the matrix of scaled coefficients. Next, right-shift module 220 may right-shift each coefficient in the matrix of biased coefficients (250). Right-shift module 220 may generate a matrix of adjusted coefficients by right-shifting each coefficient by the number of mantissa bits in each of the coefficients plus the number of bits added to the coefficient by applying the transform. After right-shift module 220 has generated the matrix of adjusted coefficients, output module 222 may output the resulting matrix of adjusted coefficients (252).

FIG. 10 is a diagram illustrating a first exemplary one-dimensional transform 260. As illustrated in the example of FIG. 10, transform 260 may take as input values $X_0$ through $X_7$. Values $X_0$ through $X_7$ may represent coefficients of one row or column of an input coefficient matrix. Transform 260 may output values $X_0$ through $X_7$. When values $X_0$ through $X_7$ are values in a row of coefficients in an input coefficient matrix, values $X_0$ through $X_7$ may represent a row of intermediate values. When values $X_0$ through $X_7$ are values in a column of coefficients, values $X_0$ through $X_7$ may represent a column of shifted pixel component values. As illustrated in the example of FIG. 10, circles that encompass "+" symbols indicate addition operations and circles that encompass "X" symbols indicate multiplication operations. Letter/number combinations indicate values by which a value is multiplied. For example, on line x2 the "A1" symbol is positioned over a circle that encompasses an "X" symbol. This indicates that the value on line $X_2$ is multiplied by value A1.

Transform 260 includes a set of "butterfly structures operations." A "butterfly structure operation" may be a software or hardware structure in which a first output value u is calculated by multiplying a first input value x by a first factor C to create a first intermediate value, multiplying a second input value y by a second factor S to create a second intermediate value, and then adding the first intermediate value and the second intermediate value. In this more complex "butterfly structure operation," a second output value v may be calculated by multiplying the second input value y by the first factor to create a third intermediate value, multiplying the first input value x by the second factor S to create a fourth intermediate value, and then subtracting the third intermediate value from the fourth intermediate value. The following formulae summarize the mathematical result of a "butterfly structure operation":

$$u = x*C + y*S;$$

$$v = X*S - y*C.$$

Butterfly structure operation 264 illustrates one butterfly structure operation used in transform 260. Butterfly structure operations have this name due to the fact that butterfly structure operations appear to have two "wings" because of the crossover of values from the first input value to the second input value and from the second input value to the first input value.

As used in transform 260, the first factor C and the second factor S may be irrational numbers. For example, C may be equal to $\sqrt{2} \cos(3\pi/8)$ and S may be equal to $\sqrt{2} \cos(3\pi/8)$.

Because inverse vector transform module 146 may use fixed-point arithmetic in 16-bit registers and because C and S are frequently irrational values, it may be computationally inconvenient to multiply input values x and y by C and S. For this reason, inverse vector transform module 146 may use rational number approximations to C and S. These integer approximations may be of the form $(C'/2^j)$ and $(S'/2^k)$, where C' and S' are "integerized" versions of C and S and j and k are integers. For example, let $C=\sqrt{2} \cos(3\pi/8)$. In the example, inverse vector transform module 146 may use the integer values $C'=2217$ and $j=12$ to approximate $\sqrt{2} \cos(3\pi/8)$ because $2217/2^{12} = 0.541259766$ and $\sqrt{2} \cos(3\pi/8) \approx 0.5411961...$. In this example, it is clear that 0.5411961 is approximately equal to 0.541259766. Thus, calculations of the form:

$$u = x*C + y*S;$$

$$v = x*S - y*C$$

may be replaced by calculations of the form:

$$u' = x*(C'/2^j) + y*(S'/2^k);$$

$$v' = x*(S'/2^j) - y*(C'/2^j).$$

In order to further simplify these calculations, the division operations by $2^j$ and $2^k$ may be replaced by bitwise right shift operations by j and k positions, denoted using the ">>" symbol:

$$u'' = ((x*C') >> j) + ((y*S') >> k);$$

$$v'' = ((x*S') >> k) - ((y*C') >> j).$$

However, as discussed above in regards to adding bias values to the DC coefficient, replacing a division operation by a bitwise right-shift operation may lead to differences between u' and u" and v' and v". Adding midpoint bias values to terms in these calculations may reduce the differences between u' and u" and between v' and v". When midpoint bias values are added calculations may take the form:

$$u''' = ((x*C' + (1 << (j-1))) >> j) + ((y*S' + (1 << (k-1))) >> k);$$

$$v''' = ((x*S' + (1 << (k-1))) >> k) - ((y*C' + (1 << (j-1))) >> j).$$

While the addition of midpoint bias values may result in the differences between u and u''' and v and v''' being smaller than the differences between u and u''' and v and v''', the addition of midpoint bias values may add computational complexity to a butterfly structure operation. Moreover, the addition of midpoint bias values may make computation of u''' and v''' impractical when using fixed-point arithmetic in 16-bit registers. The addition of midpoint bias values may make computation of u''' and v''' impractical because the addition of midpoint bias values occurs before the right shift, and, consequently may lead to register overflow.

The average difference between $v=x*S-y*C$ and $v''=((x*S') >> k) - ((y*C') >> j)$ is approximately zero. In other words, the mean of all values (v"−v) for all values x and y is approximately equal to zero. In addition, the average difference between $v=x*S-y*C$ and $v'''=((x*S'+(1<<(k-1)))>>k) - ((y*C'+(1<<(j-1)))>>j)$ is also approximately zero. This is because v" and v''' are always approximately equal. v" and v''' are always approximately the equal because when j is equal to k, the midpoint bias value is cancelled out by the subtraction:

$$v''' = ((x*C'+m) >> j) - ((y*S'+m) >> k) \approx (x*C'+m)/2^j - (y*S'+m)/2^k = (x*C')/2^j + (m/2^j) - (y*S')/2^k - (m/2^k) = (x*C')/2^j - (y*S')/2^k \approx v'' = ((x*C') >> j) - ((y*S')k)$$

where m represents the midpoint bias value. As this example illustrates, subtracting $(m/2^k)$ from $(m/2^j)$ when j is equal to k cancels out the midpoint bias value m. Because the average difference between v and v″ is approximately zero, inverse vector transform module 146 does not systematically introduce positive or negative bias into values generated by calculating v″ instead of v‴ and because v″ and v‴ are approximately equal, inverse vector transform module 146 may use v″ instead of v‴.

The average difference between $u=x*C+y*S$ and $u'\Delta= ((x*C'+(1<<(j-1)))>>j)+((y*S'+(1<<(k-1))>>k)$ is also approximately equal to zero. At the same time, the difference between $u=x*C+y*S$ and $u''=((x*C')>>j)+((y*S')>>k)$ is not approximately equal to zero. Rather, the average difference between u and u″ is approximately $-\frac{1}{2}$. Thus, u″ and u‴ are not approximately equal. u″ and u‴ are not approximately equal because the midpoint bias values is not cancelled out, even when j is equal to k:

$$u'''=((x*C'+m)>>k)+((y*S'+m)>>k)\approx(x*C'+m)/2^j)+ ((y*S'+m)/2^k)=((x*C')/2^j)+(m/2^j)+((y*S')/2^k)+(m/2^k)=((x*C')/2^j)+((y*S')/2^k)+(m/2^j)+(m/2^k)\neq u''= ((x*C')>>j)+((y*S')>>k).$$

Because u″ is not approximately equal to u‴, u″ may not be used in place of u‴. Attempting to use u″ in place of u‴ may result in significant differences from u.

To avoid the complexity and overflow issues associated adding midpoint bias value to every calculation, the following formula may be used in place of u‴ and u″:

$$u''''=((x*C')>>j)-((y*-S')>>k).$$

u″″ is equal to u except that in u″″, a negative version of S′ is used and $((y*-S)>>k)$ is subtracted. Like u‴, u″″ does not add midpoint bias values. However, unlike u‴, differences between u″″ and u are centered about 0. Because differences between u″″ and u are centered about zero, rounding errors are not magnified through the application of subsequent butterfly structure operations. For this reason, inverse vector transform module 146 may use u″″ to calculate u in a butterfly structure operation. For this reason, when j is equal to k, butterfly structures operations used by inverse vector transform module 146 to apply transform 260 may have the following form:

$$u''''=((x*C')>>j)-((y*-S')>>k);$$

$$v'''=((x*S')>>k)-((y*C')>>j).$$

Therefore, differences between results generated by this type of butterfly structure operation and results that would be generated by an equivalent butterfly structure operation using unlimited precision arithmetic are centered around zero and have positive or negative magnitude of 1 or less.

Alternatively, when j is equal to k, inverse vector transform module 146 may use butterfly structure operations in which right shifts have been deferred to the end of the butterfly structure operation:

$$u'=x*(C'/2^k)+y*(S'/2^k); ((x*C')/2^k)+((y*S')/2^k)= ((x*C')+(y*S'))/2^k\approx$$

$$u*=(((x*C')+(y*S')+(1<<(k-1)))>>k;$$

$$v'=x*(S'/2^k)-y*(C'/2^j)=((x*S')/2^k)-((y*C')/2^k)=((x*S')/2^k)+((-1)(y*C')/2^k)=((x*S')/2^k)+((y*-C')/2^k)= ((x*S')+(y*-C'))/2^k\approx$$

$$v*=((x*S')+(y*-C')+(1<<(k-1)))>>k.$$

Deferring the right shifts to the end of the butterfly structure operation may reduce the overall number of shift operations needed to perform the butterfly structure operation and may improve accuracy. Furthermore, 4-way multiply-accumulate instructions, available on most modern 16-bit single instruction multiple data ("SIMD") processor and digital signal processors, may be used to compute u* and v* efficiently.

Multiplications operations may be computationally expensive relative to addition, subtraction, and bitwise shifting operations. For this reason, it may be simpler to use a series of additions, subtractions, and bitwise shift operations that has the same effect as a multiplication operation. For example, suppose that C′=2217. In this example, $r=x*C'$ may be replaced with the following steps:

$$x2=(x<<3)-x;$$

$$x3=x+(x2<<6);$$

$$x4=x3-x2;$$

$$r=x3+(x4<<2).$$

In this example, x2, x3, and x4 are intermediate values. To illustrate this, consider the example where x=1:

$$7=(1<<3)-1;$$

$$449=1+(7<<6);$$

$$442=449-7;$$

$$2217=449+(442<<2).$$

$$2217=(1*2217)=(x*2217, \text{ where } x=1).$$

In this example, 1*2217=2217 and the value produced by this sequence operations when x=1 is 2217.

The following table summarizes an example set of integer value approximations that inverse vector transform module 146 may use for constant factors A1, A2, B1, B2, C1, C2, D1, and D2.

TABLE 1

Example Constant Factor Approximations Used in Transform 260

| Factor | Original value | Integer value | Algorithm for computing products: $x = x*F1, y = x*F2$: | Complexity |
|---|---|---|---|---|
| A1 | $\sqrt{2}\cos(3\pi/8)$ | 2217 | x2 = (x << 3) − x, | 5 adds |
| A2 | $\sqrt{2}\sin(3\pi/8)$ | 5352 | x3 = x + (x2 << 6), | 4 shifts |
|  |  |  | x4 = x3 − x2, |  |
|  |  |  | (2217 * x) = x3 + (x4 << 2); |  |
|  |  |  | (5352 * x) * 2 = x4 + (x2 << 7); |  |
| B1 | $\sqrt{2}\cos(5\pi/16)$ | 3218 | x2 = x + (x << 3), | 5 adds |
| B2 | $\sqrt{2}\sin(5\pi/16)$ | 4816 | x3 = x2 + (x << 4), | 4 shifts |
|  |  |  | x4 = (x3 << 5) − x, |  |

TABLE 1-continued

Example Constant Factor Approximations Used in Transform 260

| Factor | Original value | Integer value | Algorithm for computing products: $x = x*F1, y = x*F2$: | Complexity |
|---|---|---|---|---|
| C1 | $\sqrt{2}(\cos(\pi/16) - \cos(5\pi/16))$ | 2463 | $(3218 * x) * 2 = x2 + (x3 << 6);$ $(4816 * x) * 2 = x4 + x*2;$ $x2 = x + (x << 4),$ | 5 adds |
| C2 | $\sqrt{2}(\sin(5\pi/16) - \sin(\pi/16))$ | 3686 | $x3 = (x2 << 3) - x,$ $x4 = x3 + (x2 << 6),$ $x5 = x2 + (x4 << 1)$ $(2463 * x) = x5;$ $(3686 * x) = x4 + x5;$ | 4 shifts |
| D1 | $\sqrt{2}(\cos(5\pi/16) - \sin(\pi/16))$ | 2088 | $x2 = x + (x << 6),$ | 4 adds |
| D2 | $\sqrt{2}(\cos(\pi/16) + \sin(5\pi/16))$ | 10497 | $x3 = x2 << 5,$ $x4 = x2 + x3,$ $x5 = x3 + (x << 3)$ $(2088 * x) = x5;$ $(10497 * x) = x4 + (x5 << 2)$ | 4 shifts |

In Table 1, values in the "Integer value" column approximate the values in the "original value" column when divided by $2^{12}=4096$. For example, $2217/4096=0.541259766$ and $\sqrt{2} \cos(3\pi/8) \approx 0.5411961$. Similarly, $5352/4096=1.30664062$ and $\sqrt{2} \sin(3\pi/8) \approx 1.30656296$. The formulas in the "Algorithm for computing products" column summarize methods that inverse vector transform module 146 may use in place of multiplication operations by the corresponding integer values.

FIG. 11 is a diagram illustrating a second exemplary algorithm 270. As in FIG. 10, the values $X_0, X_1, X_2, X_3, X_4, X_5$, $X_6$, and $X_7$ represent input coefficients and values $x_0, x_1, x_2$, $x_3, x_4, x_5, x_6$, and $x_7$ represent output values. The value associated with a line after a circle that encompasses a "+" symbol is the result of adding the values associated with the arrows that points into the circle. The value associated with a line after a circle that encompasses an "x" symbol is the result of multiplying the coefficient positioned next to the circle and values associated with the lines that pass through the circles. The symbol "−" next to an arrow represents a negation of the value associated with the arrow. For example, if the value "10" is associated with an arrow before a "−" symbol, the value "−10" is associated with the arrow after the "−" symbol. Furthermore, it should be noted that the techniques described above to reduce rounding error using negatived coefficients and subtraction may be used in algorithm 190.

In transform 270, the values of $\alpha=\sqrt{2} \cos(3\pi/8)$, $\beta=\sqrt{2} \sin(3\pi/8)$, $\gamma=\sqrt{2} \cos(\pi/16)$, $\delta=\sqrt{2} \sin(\pi/16)$, $\epsilon=\sqrt{2} \cos(3\pi/16)$, and $\zeta=\sqrt{2} \sin(3\pi/16)$ may be approximated using rational fractions. For instance, the values of $\alpha, \beta, \gamma, \delta, \epsilon$, and $\zeta$ may be approximated using the integer approximations listed in Table 2 below.

TABLE 2

Example Constant Value Approximations Used in Transform 270

| Factor | Original value | Integer approximation | Algorithm for computing products: $x = x*F1, y = x*F2$: | Complexity |
|---|---|---|---|---|
| $\alpha$ | $\sqrt{2} \cos(3\pi/8)$ | 8867/16384 | $x2 = (x << 7) - x,$ | 6 adds |
| $\beta$ | $\sqrt{2} \sin(3\pi/8)$ | 21407/16384 | $x3 = x2 - (x << 5),$ $x4 = (x3 << 5) - x2,$ $\alpha * x \approx ((x4 + (x3 << 4)) << 1) + x,$ $\beta * x = (x3 << 8) - x4$ | 6 shifts |
| sqrt2 | $1/\sqrt{2}$ | 11585/16384 | $x2 = -x + (x << 3),$ $x3 = x2 << 7,$ $x4 = x3 - x2,$ $x5 = x4 + (x3 << 2),$ $1/\sqrt{2} * x = x5 + (x4 << 3),$ | 4 adds 4 shifts |
| $\gamma$ | $\sqrt{2} \cos(\pi/16)$ | 5681/4096 | $x2 = x + (x << 7),$ | 5 adds |
| $\delta$ | $\sqrt{2} \sin(\pi/16)$ | 565/2048 | $x3 = x2 - (x << 4),$ $y = x3 + (x3 << 2),$ $(\delta * x) = y$ $x5 = x2 + y,$ $(\gamma * x) = x2 + (x5 << 3)$ | 4 shifts |
| $\epsilon$ | $\sqrt{2} \cos(3\pi/16)$ | 9633/8192 | $x2 = x + (x << 5),$ | 6 adds |
| $\zeta$ | $\sqrt{2} \sin(3\pi/16)$ | 12873/16384 | $x3 = x2 - (x << 3),$ $x4 = x2 + (x3 << 8),$ $(\zeta * x) = ((x4 + (x << 2)) << 1) - x,$ $(\epsilon * x) = x4 + (x3 << 7)$ | 6 shifts |

In Table 2, values in the "Integer approximation" column represent integerized version of the values in the "Original value" column. For example, $\sqrt{2} \cos(3\pi/8) \approx 0.5411961$ and $8867/16384=0.54119873046875$. The equations in the "Algorithm for computing products" column of Table 2 represent algorithms by which inverse vector transform module 146 may use in place of multiplication operations by the values in the "integer approximation" column.

Figure 12:
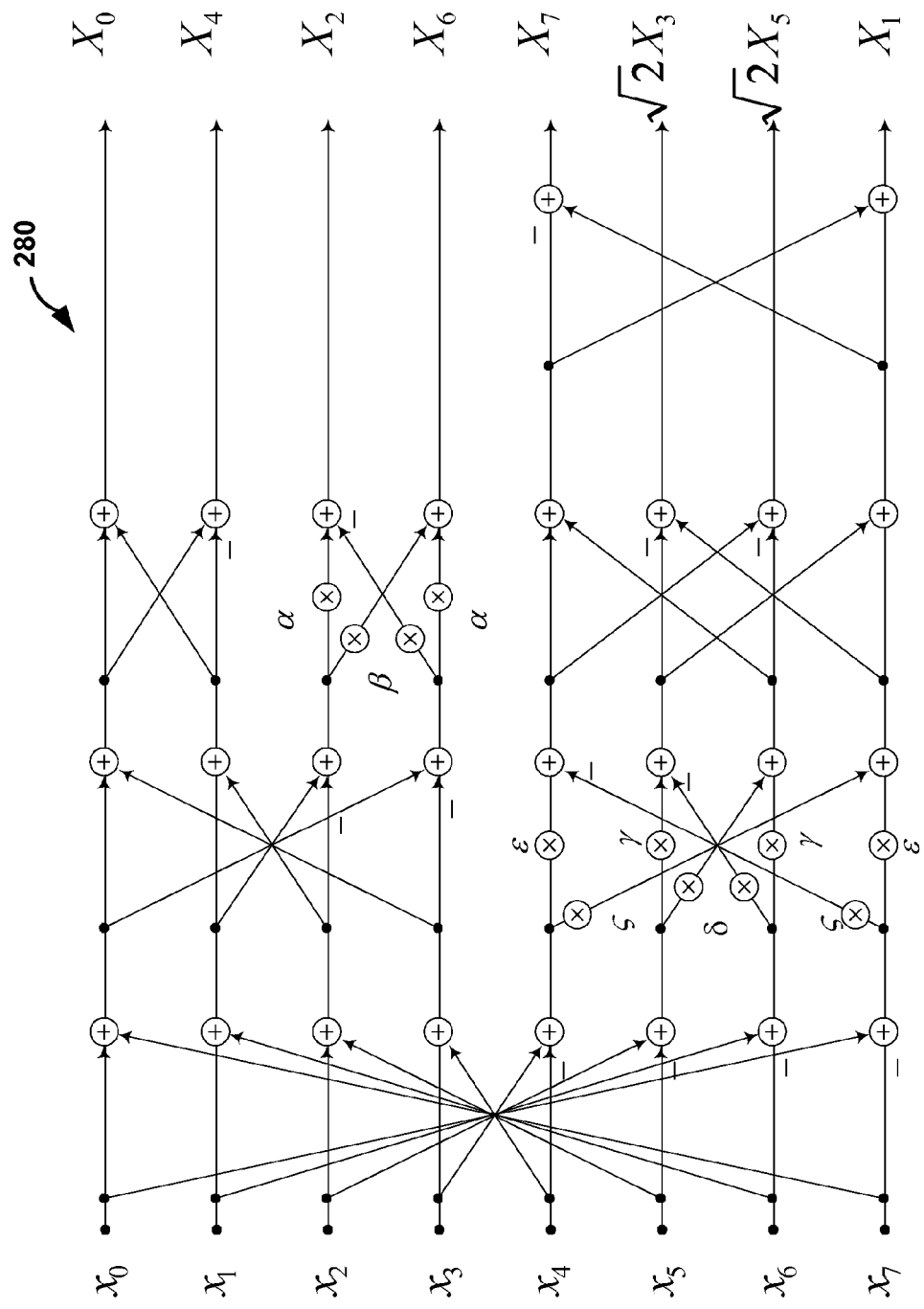
FIG. 12 is a flow diagram illustrating an exemplary scaled one-dimensional transform used by the IDCT module.

FIG. 12 is a flow diagram illustrating an exemplary transform 200 that may be used by forward vector transform module 214. In FIG. 12, the values $X_0, X_1, X_2, X_3, X_4, X_5, X_6$, and $X_7$ represent output coefficients and values $x_0$, $x_1$, $x_2$, $x_3$, $x_4$, $x_5$, $x_6$, and $X_7$ represent input values. Furthermore, it should be noted that the techniques described above to reduce rounding error using negatived coefficients and subtraction may be used in transform 270.

In the example of FIG. 12, the values of $\alpha = \sqrt{2} \cos(3\pi/8)$, $\beta = \sqrt{2} \sin(3\pi/8)$, $\gamma = \sqrt{2} \cos(\pi/16)$, $\delta = \sqrt{2} \sin(\pi/16)$, $\epsilon = \sqrt{2} \cos(3\pi/16)$, and $\zeta = \sqrt{2} \sin(3\pi/16)$ may be approximated using rational fractions. For instance, the values of $\alpha$, $\beta$, $\gamma$, $\delta$, $\epsilon$, and $\zeta$ may be approximated using the integer approximations listed in Table 2.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Various embodiments of the invention have been described. These and other embodiments are within the scope of the following claims.

The invention claimed is:

1. A method comprising:
   generating a matrix of biased coefficients by adding one or more bias values to a coefficient of a matrix of source coefficients;
   generating a matrix of transformed coefficients by using fixed-point arithmetic to repeatedly apply a one-dimensional transform to coefficients in the matrix of biased coefficients;
   generating a matrix of output coefficients by right-shifting coefficients in the matrix of transformed coefficients; and
   wherein coefficients in the matrix of output coefficients are approximations of values that would be produced by transforming the matrix of source coefficients using an ideal inverse discrete cosine transform;
   causing a media presentation unit to output audible or visible signals based on the matrix of output values;
   wherein the addition of the bias values to the coefficient causes positive errors and negative errors to be, on average, equal in magnitude and to be, on average, symmetric about zero, and
   wherein the errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

2. The method of claim 1,
   wherein coefficients in the matrix of output coefficients are pixel component values; and
   wherein the method further comprises constructing a block of pixels that include the pixel component values.

3. The method of claim 2, wherein causing a media presentation unit to output audible or visible signals based on the matrix of output values comprises causing the media presentation unit to display the block of pixels.

4. The method of claim 2, wherein the method further comprises:
   generating a first video frame by combining the block of pixels with other blocks of pixels; and
   using temporal decoding to generate one or more subsequent video frames that use the first video frame as a reference video frame.

5. The method of claim 1, wherein the coefficient is a DC coefficient of the matrix of source coefficients.

6. The method of claim 1,
   wherein the method further comprises adding a midpoint bias term to the coefficient; and
   wherein midpoint bias value is equal to $2^{P-1}$, wherein P is equal to the number of mantissa bits in fixed-point numbers used in the transform plus a number of bits that are added to coefficients in the matrix of transformed coefficients by applying the transform.

7. The method of claim 1, wherein the first magnitude is equal to $2^P$, wherein P is equal to the number of mantissa bits in fixed-point numbers used in the transform plus a number of bits that are added to coefficients in the matrix of transformed coefficients by applying the transform.

8. The method of claim 1,
   wherein generating the matrix of biased coefficients comprises adding a supplemental bias value to the coefficient; and
   wherein the supplemental bias value is equal to −1 when the coefficient is negative and equal to 0 when the coefficient is non-negative.

9. The method of claim 1,
   wherein the method further comprises selecting on a pseudo-random basis a value that is equal to either −1 or 0; and
   wherein generating the matrix of biased coefficients comprises adding the selected value to the coefficient.

10. The method of claim 1, wherein the method further comprises:
    generating a matrix of de-quantized coefficients by de-quantizing a matrix of quantized coefficients; and
    generating the matrix of source coefficients by left-shifting coefficients in the matrix of de-quantized coefficients by a number of mantissa bits of fixed-point numbers used while generating the matrix of transformed coefficients.

11. The method of claim 10,
wherein the number of mantissa bits is three; and
wherein, given the matrix of source coefficients, the matrix of output coefficients satisfies precision requirements of the Institute of Electrical and Electronics Engineers (IEEE) 1180 standard.

12. The method of claim 1, wherein generating the matrix of transformed coefficients comprises using fixed-point arithmetic to repeatedly apply the transform to coefficients in the matrix of biased coefficients without using multiplication or division operations.

13. The method of claim 1, wherein fixed-point numbers used while generating the matrix of transformed coefficients are 16-bit fixed-point numbers.

14. The method of claim 1, wherein generating the matrix of transformed coefficients comprises:
generating a matrix of intermediate coefficients by using fixed-point arithmetic to apply a series of butterfly structure operations to each row vector of the matrix of biased coefficients; and
generating the matrix of transformed coefficients by using fixed-point arithmetic to apply the series of butterfly structure operations to each column vector of the matrix of intermediate coefficients.

15. The method of claim 14,
wherein performing any of the butterfly structure operations comprises performing butterfly structure operations of the form:

$$u=(((x*C')+(y*S')+(1<<(k-1)))>>k;$$

$$v=((x*S')+(y*-C')+(1<<(k-1)))>>k,$$

wherein u, v, x, and y are fixed-point numbers,
wherein x and y are input values and u and v are output values; and wherein C, S, and k are integers.

16. The method of claim 14, wherein differences between results generated by one of the butterfly structure operations and results that would be generated by an equivalent butterfly structure operation using unlimited precision arithmetic are centered around zero and have positive or negative magnitude of 1 or less.

17. The method of claim 16,
wherein performing any of the butterfly structure operations comprises performing butterfly structure operations of the form:

$$u=((x*C)>>k)-((y*-S)>>k);$$

$$v=((x*S)>>k)-((y*C)>>k),$$

wherein u, v, x, and y are fixed-point numbers,
wherein x and y are input values and u and v are output values; and wherein C, S, and k are integers.

18. A wireless communication device comprising:
a coefficient biasing module that generates a matrix of biased coefficients by adding one or more bias values to a coefficient of the matrix of source coefficients;
an inverse transform module that generates a matrix of transformed coefficients by using fixed-point arithmetic to repeatedly apply a one-dimensional transform to coefficients in the matrix of biased coefficients;
a right-shift module that generates a matrix of output coefficients by right-shift coefficients in the matrix of transformed coefficients; and
wherein coefficients in the matrix of output coefficients are approximations of values that would be produced by transforming the matrix of source coefficients using an ideal inverse discrete cosine transform; and
a presentation driver that causes a media presentation unit to output audible or visible signals based on the matrix of output coefficients;
wherein the addition of the bias values to the coefficient causes positive errors and negative errors to be, on average, equal in magnitude and to be, on average, symmetric about zero, and
wherein the errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

19. A device comprising:
a coefficient biasing module that generates a matrix of biased coefficients by adding one or more bias values to a coefficient of the matrix of source coefficients;
an inverse transform module that generates a matrix of transformed coefficients by using fixed-point arithmetic to repeatedly apply a one-dimensional transform to coefficients in the matrix of biased coefficients;
a right-shift module that generates a matrix of output coefficients by right-shift coefficients in the matrix of transformed coefficients; and
wherein coefficients in the matrix of output coefficients are approximations of values that would be produced by transforming the matrix of source coefficients using an ideal inverse discrete cosine transform; and
a presentation driver that causes a media presentation unit to output audible or visible signals based on the matrix of output coefficients;
wherein the addition of the bias values to the coefficient causes positive errors and negative errors to be, on average, equal in magnitude and to be, on average, symmetric about zero, and
wherein the errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

20. The device of claim 19,
wherein coefficients in the matrix of output coefficients sare pixel component values; and
wherein the device further comprises a pixel reconstruction module that constructs a block of pixels that include the pixel component values.

21. The device of claim 20,
wherein the presentation driver causes the media presentation unit to display the block of pixels.

22. The device of claim 20, wherein the device further comprises:
a block combiner module that generates a first video frame by combining the block of pixels with other blocks of pixels; and
a predictive frame generation module that generates one or more subsequent video frames that use the first video frame as a reference video frame.

23. The device of claim 19, wherein the coefficient is a DC coefficient of the matrix of coefficients.

24. The device of claim 19,
wherein the coefficient biasing module generates the matrix of biased coefficients by adding a midpoint bias value to the coefficient; and wherein the midpoint bias value is equal to $2^{P-1}$, wherein P is equal to the number of mantissa bits in fixed-point numbers used in the transform plus a number of bits that are added to coefficients in the matrix of transformed coefficients by applying the transform.

25. The device of claim 19, wherein the first magnitude is equal to $2^P$, wherein P is equal to the number of mantissa bits in fixed-point numbers used in the transform plus a number of bits that are added to coefficients in the matrix of transformed coefficients by applying the transform.

26. The device of claim 19, wherein the coefficient biasing module generates the matrix of biased coefficients by adding a supplemental bias value that is equal to −1 when the coefficient is negative and that is equal to 0 when the coefficient is non-negative.

27. The device of claim 19,
wherein the coefficient biasing module generates the matrix of biased coefficients by selecting, on a pseudorandom basis, a value that is equal to either −1 or 0, and adding the selected value to the coefficient as a supplemental bias values.

28. The device of claim 19, wherein the device further comprises:
a de-quantization module that generates a matrix of de-quantized coefficients by de-quantizing a matrix of de-quantized coefficients; and
a scaling module that generates the matrix of source coefficients by left-shifting coefficients in the matrix of de-quantized coefficients by a number of mantissa bits of fixed-point number used while generating the matrix of transformed coefficients.

29. The device of claim 28,
wherein the number of mantissa bits is three; and
wherein, given the matrix of source coefficients, the matrix of output coefficients satisfies precision requirements of the Institute of Electrical and Electronics Engineers (IEEE) 1180 standard.

30. The device of claim 19, wherein the inverse transform module uses 16-bit fixed-point numbers when using fixed-point arithmetic to repeatedly apply the one-dimensional transform to coefficients in the matrix of biased coefficients.

31. The device of claim 19, wherein the inverse transform module uses fixed-point arithmetic to apply a series of butterfly structure operations to each row vector of the matrix of scaled coefficients to produce a matrix of intermediate coefficients and uses fixed-point arithmetic to apply the series of butterfly structure operations to each column vector of the matrix of intermediate coefficients to produce the matrix of transformed coefficients.

32. The device of claim 31,
wherein the butterfly structure operations are of the form:

$$u=(((x*C')+(y*S')+(1<<(k-1)))>>k;$$

$$v=((x*S')+(y*-C')+(1<<(k-1)))>>k,$$

wherein u, v, x, and y are fixed-point numbers,
wherein x and y are input values and u and v are output values; and wherein C, S, and k are integers.

33. The device of claim 31, wherein differences between results generated by one of the butterfly structure operations and results that would be generated by an equivalent butterfly structure operation using unlimited precision arithmetic are centered around zero and have positive or negative magnitude of 1 or less.

34. The device of claim 33,
wherein the butterfly structure operations are of the form:

$$u=((x*C)>>k)-((y*-S)>>k);$$

$$v=((x*S)>>k)-((y*C)>>k),$$

wherein u, v, x, and y are fixed-point numbers,
wherein x and y are input values and u and v are output values; and wherein C, S, and k are integers.

35. A device comprising,
means for generating a matrix of biased coefficients by adding one or more bias values to a coefficient of a matrix of source coefficients;
means for generating a matrix of transformed coefficients by using fixed-point arithmetic to repeatedly apply a one-dimensional transform to coefficients in the matrix of biased coefficients;
means for generating a matrix of output coefficients by right-shifting coefficients in the matrix of transformed coefficients;
wherein coefficients in the matrix of output coefficients are approximations of values that would be produced by transforming the matrix of source coefficients using an ideal inverse discrete cosine transform; and
means for causing a media presentation unit to output audible or visible signals based on the matrix of output values;
wherein the addition of the bias values to the coefficient causes positive errors and negative errors to be, on average, equal in magnitude and to be, on average, symmetric about zero, and wherein the errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

36. The device of claim 35,
wherein coefficients in the matrix of output coefficients are pixel component values; and
wherein the device further comprises means for constructing a block of pixels that include the pixel component values.

37. The device of claim 36, wherein the means for causing a media presentation unit to output audible or visible signals based on the matrix of output values comprises means for causing the media presentation unit to display the block of pixels.

38. The device of claim 36, wherein the method further comprises:
means for generating a first video frame by combining the block of pixels with other blocks of pixels; and
means for using temporal decoding to generate one or more subsequent video frames that use the first video frame as a reference video frame.

39. The device of claim 35, wherein the coefficient is a DC coefficient of the matrix of source coefficients.

40. The device of claim 35,
wherein the means for generating the matrix of biased coefficients comprises means for adding a midpoint bias value to the coefficient; and
wherein the midpoint bias value is equal to $2^{P-1}$, wherein P is equal to the number of mantissa bits in fixed-point numbers used in the transform plus a number of bits that are added to coefficients in the matrix of transformed coefficients by applying the transform.

41. The device of claim 40, wherein first magnitude is equal to $2^P$, wherein P is equal to the number of mantissa bits in fixed-point numbers used in the transform plus a number of bits that are added to coefficients in the matrix of transformed coefficients by applying the transform.

42. The device of claim 35,
wherein the means for generating the matrix of biased coefficients comprises means for adding a supplemental bias value to the coefficient;
wherein the supplemental bias value is equal to 31 1 when the coefficient is negative and equal to 0 when the coefficient is non-negative.

43. The device of claim 35,
wherein the method further comprises selecting on a pseudo-random basis a value that is equal to either −1 or 0; and
wherein the means for generating the matrix of biased coefficients comprises means for adding the selected value to the coefficient.

44. The device of claim 35, wherein the device further comprises:
means for generating a matrix of de-quantized coefficients by de-quantizing a matrix of quantized coefficients; and
means for generating the matrix of source coefficients by left-shifting coefficients in the matrix of de-quantized coefficients by a number of mantissa bits of fixed-point numbers used while generating the matrix of transformed coefficients.

45. The device of claim 44,
wherein the number of mantissa bits is three; and
wherein, given the matrix of source coefficients, the matrix of output coefficients satisfies precision requirements of the Institute of Electrical and Electronics Engineers (IEEE) 1180 standard.

46. The device of claim 35, wherein the means for generating the matrix of transformed coefficients comprise means for using fixed-point arithmetic to repeatedly apply the transform to coefficients in the matrix of biased coefficients without using multiplication or division operations.

47. The device of claim 35, wherein the means for generating the matrix of transformed coefficients uses 16-bit fixed-point numbers when using fixed-point arithmetic to repeatedly apply the one-dimensional transform to coefficients in the matrix of biased coefficients.

48. The device of claim 35, wherein generating the matrix of transformed coefficients comprises:
means for generating a matrix of intermediate coefficients by using fixed-point arithmetic to apply a series of butterfly structure operations to each row vector of the matrix of biased coefficients; and
means for generating the matrix of transformed coefficients by using fixed-point arithmetic to apply the series of butterfly structure operations to each column vector of the matrix of intermediate coefficients.

49. The device of claim 48,
wherein the means for performing any of the butterfly structure operations comprises means for performing butterfly structure operations of the form:

$$u=(((x*C')+(y*S')+(1<<(k-1)))>>k;$$

$$v=((x*S')+(y*-C')+(1<<(k-1)))>>k,$$

wherein u, v, x, and y are fixed-point numbers,
wherein x and y are input values and u and v are output values; and wherein C, S, and k are integers.

50. The device of claim 48, wherein differences between results generated by one of the butterfly structure operations and results that would be generated by an equivalent butterfly structure operation using unlimited precision arithmetic are centered around zero and have positive or negative magnitude of 1 or less.

51. The device of claim 50,
wherein the means for performing any of the butterfly structure operations comprises means for performing butterfly structure operations of the form:

$$u=((x*C)>>k)-((y*-S)>>k);$$

$$v=((x*S)>>k)-((y*C)>>k),$$

wherein u, v, x, and y are fixed-point numbers,
wherein x and y are input values and u and v are output values; and wherein C, S, and k are integers.

52. A non-transitory computer-readable medium comprising instructions, when executed the instructions cause a processor to:
generate a matrix of biased coefficients by adding one or more bias values to a coefficient of a matrix of source coefficients;
generate a matrix of transformed coefficients by using fixed-point arithmetic to repeatedly apply a one-dimensional transform to coefficients in the matrix of biased coefficients;
generate a matrix of output coefficients by right-shifting coefficients in the matrix of transformed coefficients;
wherein coefficients in the matrix of output coefficients are approximations of values that would be produced by transforming the matrix of source coefficients using an ideal inverse discrete cosine transform; and
cause a media presentation unit to output audible or visible signals based on the matrix of output values;
wherein the addition of the bias values to the coefficient causes positive errors and negative errors to be, on average, equal in magnitude and to be, on average, symmetric about zero, and
wherein the errors represent differences between values that result from right-shifting limited precision fixed-point representations of coefficients in the matrix of transformed coefficients by a first magnitude and results from dividing the coefficients in the matrix of transformed coefficients by 2 raised to the power of the first magnitude, without regard to precision.

53. The computer-readable medium of claim 52,
wherein coefficients in the matrix of output coefficients are pixel component values; and
wherein the instructions further cause the processor to construct a block of pixels that include the pixel component values.

54. The computer-readable medium of claim 53, wherein the instructions cause the processor to cause the media presentation unit to output audible or visible signals based on the matrix of output values by causing the processor to cause the media presentation unit of display the block of pixels.

55. The computer-readable medium of claim 53, wherein the instructions further cause the processor to:
generate a first video frame by combining the block of pixels with other blocks of pixels; and
use temporal decoding to generate one or more subsequent video frames that use the first video frame as a reference video frame.

56. The computer-readable medium of claim 52, wherein the coefficient is a DC coefficient of the matrix of coefficients.

57. The computer-readable medium of claim 52,
wherein the instructions further cause the processor to add a midpoint bias value to the coefficient; and wherein the midpoint bias value is equal to $2^{P-1}$, wherein P is equal to the number of mantissa bits in fixed-point numbers used in the transform plus a number of bits that are added to coefficients in the matrix of transformed coefficients by applying the transform.

58. The computer-readable medium of claim 52, wherein the first magnitude is equal to $2^P$, wherein P is equal to the number of mantissa bits in fixed-point numbers used in the transform plus a number of bits that are added to coefficients in the matrix of transformed coefficients by applying the transform.

59. The computer-readable medium of claim 52,
wherein the instructions further cause the processor to generate the matrix of biased coefficients cause the processor to add a supplemental bias value to the coefficient; and
wherein the supplemental bias value is equal to −1 when the coefficient is negative and equal to 0 when the coefficient is non-negative.

60. The computer-readable medium of claim 52,
wherein the instructions further cause the processor to select on a pseudo-random basis a value that is equal to either −1 or 0; and
wherein the instructions that cause the processor to generate the matrix of biased coefficients cause the processor to add the selected value to the coefficient.

61. The computer-readable medium of claim 52, wherein the instructions further cause the processor to:
generate a matrix of de-quantized coefficients by de-quantizing a matrix of quantized coefficients; and
generating the matrix of source coefficients by left-shifting coefficients in the matrix of de-quantized coefficients by a number of mantissa bits of fixed-point numbers used while generating the matrix of transformed coefficients.

62. The computer-readable medium of claim 61,
wherein the number of mantissa bits is three; and
wherein, given the matrix of source coefficients, the matrix of output coefficients satisfies precision requirements of the Institute of Electrical and Electronics Engineers (IEEE) 1180 standard.

63. The computer-readable medium of claim 52, wherein the instructions cause the processor to generate the matrix of transformed coefficients by causing the processor to repeatedly apply the transform to coefficients in the matrix of biased coefficients without using multiplication or division operations.

64. The computer-readable medium of claim 52, wherein the instructions cause the processor to use 16-bit fixed-point numbers when the instructions cause the processor to use fixed-point arithmetic to repeatedly apply the one-dimensional transform to coefficients in the matrix of biased coefficients.

65. The computer-readable medium of claim 52, wherein the instructions cause the processor to generate the matrix of transformed coefficients by causing the processor to:
generate a matrix of intermediate coefficients by using fixed-point arithmetic to apply a series of butterfly structure operations to each row vector of the matrix of biased coefficients; and
generate the matrix of transformed coefficients by using fixed-point arithmetic to apply the series of butterfly structure operations to each column vector of the matrix of intermediate coefficients.

66. The computer-readable medium of claim 65,
wherein the instructions cause the processor to perform any of the butterfly structure operations by causing the processor to perform butterfly structure operations of the form:

$$u=(((x*C')+(y*S')+(1<<(k-1)))>>k;$$

$$v=((x*S')+(y*-C')+(1<<(k-1)))>>k,$$

wherein u, v, x, and y are fixed-point numbers,
wherein x and y are input values and u and v are output values; and wherein C, S, and k are integers.

67. The computer-readable medium of claim 65, wherein differences between results generated by one of the butterfly structure operations and results that would be generated by an equivalent butterfly structure operation using unlimited precision arithmetic are centered around zero and have positive or negative magnitude of 1 or less.

68. The computer-readable medium of claim 66,
wherein the instruction cause the processor to perform any of the butterfly structure operations by causing the processor to perform butterfly structure operations of the form:

$$u=((x*C)>>k)-((y*-S)>>k);$$

$$v=((x*S)>>k)-((y*C)>>k),$$

wherein u, v, x, and y are fixed-point numbers,
wherein x and y are input values and u and v are output values; and wherein C, S, and k are integers.

69. A method comprising:
generating a matrix of adjusted coefficients by left-shifting each coefficient in a matrix of source coefficients;
generating a matrix of transformed coefficients by using fixed-point arithmetic to repeatedly apply a one-dimensional transform to coefficients in the matrix of adjusted coefficients;
generating a matrix of scaled coefficients by scaling each coefficient in the matrix of transformed coefficients;
generating a matrix of biased coefficients by adding one or more bias values to one or more coefficients in the matrix of scaled coefficients; and
generating a matrix of output coefficients by right-shifting coefficients in the matrix of biased coefficients by a first magnitude;
wherein the matrix of source coefficients represents media data;
wherein coefficients in the matrix of output coefficients are approximations of values that would be produced by transforming the matrix of source coefficients using an ideal forward discrete cosine transform;
wherein the addition of the bias values to the coefficient causes positive errors and negative errors to be, on average, equal in magnitude and to be, on average, symmetric about zero, and
wherein the errors represent differences between values that result from right-shifting limited precision fixed-point representations of coefficients in the matrix of biased coefficients by the first magnitude and results from dividing the coefficients in the matrix of biased coefficients by 2 raised to the power of the first magnitude, without regard to precision.

70. The method of claim 69, wherein the first magnitude is equal to $2^P$, wherein P is equal to the number of mantissa bits in fixed-point numbers used in the transform plus a number of bits that are added to coefficients in the matrix of transformed coefficients by applying the transform.

71. The method of claim 69,
wherein generating the matrix of biased coefficients comprises adding a supplemental bias value to one or more coefficients in the matrix of scaled coefficients; and
wherein the supplemental bias value is equal to −1 when the coefficient is negative and equal to 0 when the coefficient is non-negative.

72. The method of claim 69,
wherein the method further comprises selecting, on a pseudo-random basis, a value that is equal to either −1 or 0; and
wherein generating the matrix of biased coefficients comprises adding the selected value to one or more coefficients in the matrix of scaled coefficients.

73. A device comprising:
a left-shift module that generates a matrix of adjusted coefficients by left-shifting each coefficient in a matrix of source coefficients;
a forward transform module that generates a matrix of transformed coefficients by using fixed-point arithmetic to repeatedly apply a one-dimensional transform to coefficients in the matrix of adjusted coefficients;
a scaling module that generates a matrix of scaled coefficients by scaling each coefficient in the matrix of transformed coefficients;
a coefficient biasing module that generates a matrix of biased coefficients by adding one or more bias values to one or more coefficients in the matrix of scaled coefficients; and
a right-shift module that generates a matrix of output coefficients by right-shifting coefficient in the matrix of biased coefficients by a first magnitude;
wherein the matrix of source coefficients represents media data;
wherein coefficients in the matrix of output coefficients are approximations of values that would be produced by transforming the matrix of source coefficients using an ideal forward discrete cosine transform;
wherein the addition of the bias values to the coefficient causes positive errors and negative errors to be, on average, equal in magnitude and to be, on average, symmetric about zero, and
wherein the errors represent differences between values that result from right-shifting limited precision fixed-point representations of coefficients in the matrix of biased coefficients by the first magnitude and results from dividing the coefficients in the matrix of biased coefficients by 2 raised to the power of the first magnitude, without regard to precision.

74. The device of claim 73, wherein the first magnitude is equal to $2^P$, wherein P is equal to the number of mantissa bits in fixed-point numbers used in the transform plus a number of bits that are added to coefficients in the matrix of transformed coefficients by applying the transform.

75. The device of claim 73,
wherein the coefficient biasing module generates the matrix of biased coefficients by adding a supplemental bias value to one or more coefficients in the matrix of scaled coefficients; and
wherein the supplemental bias value is equal to −1 when the coefficient is negative and equal to 0 when the coefficient is non-negative.

76. The device of claim 73,
wherein the coefficient biasing module selects, on a pseudo-random basis, a value that is equal to either −1 or 0 and adds the selected value to one or more coefficients in the matrix of scaled coefficients.

77. A device comprising:
means for generating a matrix of adjusted coefficients by left-shifting each coefficient in a matrix of source coefficients;
means for generating a matrix of transformed coefficients by using fixed-point arithmetic to repeatedly apply a one-dimensional transform to coefficients in the matrix of adjusted coefficients;
means for generating a matrix of scaled coefficients by scaling each coefficient in the matrix of transformed coefficients;
means for generating a matrix of biased coefficients by adding one or more bias values to one or more coefficients in the matrix of scaled coefficients; and
means for generating a matrix of output coefficients by right-shifting coefficient in the matrix of biased coefficients by a first magnitude;
wherein the matrix of source coefficients represents media data;
wherein coefficients in the matrix of output coefficients are approximations of values that would be produced by transforming the matrix of source coefficients using an ideal forward discrete cosine transform;
wherein the addition of the bias values to the coefficient causes positive errors and negative errors to be, on average, equal in magnitude and to be, on average, symmetric about zero, and
wherein the errors represent differences between values that result from right-shifting limited precision fixed-point representations of coefficients in the matrix of biased coefficients by the first magnitude and results from dividing the coefficients in the matrix of biased coefficients by 2 raised to the power of the first magnitude, without regard to precision.

78. The device of claim 77, wherein the first magnitude is equal to $2^P$, wherein P is equal to the number of mantissa bits in fixed-point numbers used in the transform plus a number of bits that are added to coefficients in the matrix of transformed coefficients by applying the transform.

79. The device of claim 77,
wherein the means for generating the matrix of biased coefficients generates the matrix of biased coefficients by adding a supplemental bias value to one or more coefficients in the matrix of scaled coefficients; and
wherein the supplemental bias value is equal to −1 when the coefficient is negative and equal to 0 when the coefficient is non-negative.

80. The device of claim 77,
wherein the means for generating the matrix of biased coefficients selects, on a pseudo-random basis, a value that is equal to either −1 or 0 and adds the selected value to one or more coefficients in the matrix of scaled coefficients.

81. A non-transitory computer-readable medium comprising instructions, wherein the instructions cause a programmable processor to:
generate a matrix of adjusted coefficients by left-shifting each coefficient in a matrix of source coefficients;
generate a matrix of transformed coefficients by using fixed-point arithmetic to repeatedly apply a one-dimensional transform to coefficients in the matrix of adjusted coefficients;
generate a matrix of scaled coefficients by scaling each coefficient in the matrix of transformed coefficients;
generate a matrix of biased coefficients by adding one or more bias values to one or more coefficients in the matrix of scaled coefficients; and generate a matrix of output coefficients by right-shifting coefficients in the matrix of biased coefficients by a first magnitude;

wherein the matrix of source coefficients represents media data;

wherein coefficients in the matrix of output coefficients are approximations of values that would be produced by transforming the matrix of source coefficients using an ideal forward discrete cosine transform;

wherein the addition of the bias values to the coefficient causes positive errors and negative errors to be, on average, equal in magnitude and to be, on average, symmetric about zero, and wherein the errors represent differences between values that result from right-shifting limited precision fixed-point representations of coefficients in the matrix of biased coefficients by the first magnitude and results from dividing the coefficients in the matrix of biased coefficients by 2 raised to the power of the first magnitude, without regard to precision.

82. The computer-readable medium of claim 81, wherein the first magnitude is equal to $2^P$, wherein P is equal to the number of mantissa bits in fixed-point numbers used in the transform plus a number of bits that are added to coefficients in the matrix of transformed coefficients by applying the transform.

83. The computer-readable medium of claim 81, wherein the instructions cause the processor to generate the matrix of biased coefficients by causing the processor to add a supplemental bias value to one or more coefficients in the matrix of scaled coefficients; and wherein the supplemental bias value is equal to −1 when the coefficient is negative and equal to 0 when the coefficient is non-negative.

84. The computer-readable medium of claim 81, wherein the instructions cause the processor to generate the matrix of biased coefficients by causing the processor to: select, on a pseudo-random basis, a value that is equal to either −1 or 0; and to add the selected value to one or more coefficients in the matrix of scaled coefficients.

* * * * *